(12) United States Patent
Spader et al.

(10) Patent No.: US 10,706,573 B1
(45) Date of Patent: *Jul. 7, 2020

(54) STRUCTURAL CHARACTERISTIC EXTRACTION FROM 3D IMAGES

(71) Applicant: State Farm Mutual Automobile Insurance Company, Bloomington, IL (US)

(72) Inventors: Timothy J. Spader, Bloomington, IL (US); George T. Dulee, Jr., Bloomington, IL (US); Donald Yuhas, Bloomington, IL (US); Aaron Brucker, Bloomington, IL (US); Chris Stroh, Bloomington, IL (US); Jeffrey Mousty, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,961

(22) Filed: Mar. 13, 2019

Related U.S. Application Data

(63) Continuation of application No. 15/245,529, filed on Aug. 24, 2016.

(Continued)

(51) Int. Cl.
*G06Q 40/00* (2012.01)
*G06T 7/60* (2017.01)
(Continued)

(52) U.S. Cl.
CPC .............. *G06T 7/60* (2013.01); *G06Q 40/08* (2013.01); *G06T 1/0007* (2013.01); *G06T 2207/10012* (2013.01)

(58) Field of Classification Search
None
See application file for complete search history.

(56) References Cited

U.S. PATENT DOCUMENTS

| | | |
|---|---|---|
| 5,742,335 A | 4/1998 | Cannon |
| 5,842,148 A | 11/1998 | Prendergast |

(Continued)

OTHER PUBLICATIONS

Wolverto0030175n, Troy, "Statrup Debuts 3-D Modeling: System Employs Kinect Sensors to capture three dimensions of a room and the objects within it", San Jose Mercury News, San Jose Calif., Mar. 13, 2014, pp. 1-3 (Year: 2014).

(Continued)

*Primary Examiner* — Iman K Kholdebarin
(74) *Attorney, Agent, or Firm* — Armstrong Teasdale LLP

(57) ABSTRACT

A structural analysis computing device for determining structural characteristics of an object pictured in a three-dimensional (3D) image may be provided. The structural analysis computing device may include a memory, a user interface, an object sensor configured to capture the 3D image of the object, and at least one processor in communication with the memory and the object sensor. The processor may be configured to access the 3D image including the object, automatically determine a first plurality of measurements of the object from the 3D image, and display the 3D image on the user interface. The processor may be further configured to generate a data file including the 3D image and the first plurality of measurements, and store the data file within the memory. The processor may also be configured to transmit the data file to an insurance server computing device for generation of an associated insurance claim form.

20 Claims, 15 Drawing Sheets

Related U.S. Application Data

(60) Provisional application No. 62/299,658, filed on Feb. 25, 2016, provisional application No. 62/290,233, filed on Feb. 2, 2016, provisional application No. 62/290,215, filed on Feb. 2, 2016, provisional application No. 62/266,454, filed on Dec. 11, 2015.

(51) Int. Cl.
*G06T 1/00* (2006.01)
*G06Q 40/08* (2012.01)

(56) References Cited

U.S. PATENT DOCUMENTS

| | | | |
|---|---|---|---|
| 6,009,189 | A | 12/1999 | Schaack |
| 6,442,292 | B1 | 8/2002 | Otani |
| 7,953,615 | B2 | 5/2011 | Aquila et al. |
| 8,271,303 | B2 | 9/2012 | Helitzer et al. |
| 8,284,194 | B2 | 10/2012 | Zhang et al. |
| 8,346,578 | B1 * | 1/2013 | Hopkins, III .......... G06Q 40/00 382/100 |
| 8,515,152 | B2 | 8/2013 | Siri |
| 8,719,134 | B1 | 5/2014 | Huls |
| 8,756,085 | B1 * | 6/2014 | Plummer ............. H04N 13/204 705/4 |
| 8,774,471 | B1 | 7/2014 | Laaser |
| 8,818,572 | B1 | 8/2014 | Tofte et al. |
| 8,843,350 | B2 | 9/2014 | Jacobi et al. |
| 8,937,648 | B2 | 1/2015 | Yang |
| 8,942,468 | B1 | 1/2015 | Toshev et al. |
| 8,958,630 | B1 * | 2/2015 | Gallup ................. G06K 9/6293 382/159 |
| 8,989,440 | B2 | 3/2015 | Klusza |
| 8,994,726 | B1 | 3/2015 | Furukawa |
| 9,135,737 | B2 | 9/2015 | Pershing |
| 9,153,079 | B1 | 10/2015 | Wood |
| 9,336,552 | B1 | 5/2016 | Freeman et al. |
| 9,389,314 | B1 | 7/2016 | Boyer et al. |
| 9,424,606 | B2 | 8/2016 | Wilson, II et al. |
| 9,613,423 | B2 | 4/2017 | Dixon |
| 9,665,800 | B1 * | 5/2017 | Kuffner, Jr. ............ G06T 15/50 |
| 9,691,189 | B1 * | 6/2017 | Creath .................. G06T 11/00 |
| 9,697,469 | B2 * | 7/2017 | McMahon ............ G06N 5/047 |
| 9,721,264 | B2 | 8/2017 | Labrie et al. |
| 9,767,566 | B1 | 9/2017 | Paczkowski |
| 9,786,011 | B1 | 10/2017 | Engelhorn |
| 9,824,397 | B1 | 11/2017 | Patel |
| 9,824,453 | B1 * | 11/2017 | Collins ............... G06F 16/5838 |
| 9,851,440 | B1 | 12/2017 | Boyer |
| 10,055,876 | B2 | 8/2018 | Ford |
| 10,102,584 | B1 * | 10/2018 | Devereaux ............. G06Q 10/20 |
| 10,157,405 | B1 * | 12/2018 | Hopkins ............ G06Q 30/0278 |
| 2006/0229774 | A1 | 10/2006 | Park |
| 2007/0179868 | A1 | 8/2007 | Bozym |
| 2009/0055226 | A1 | 2/2009 | Tritz et al. |
| 2009/0138290 | A1 | 5/2009 | Holden |
| 2009/0179734 | A1 | 7/2009 | Do |
| 2009/0185800 | A1 * | 7/2009 | Lee ........................ G03B 7/003 396/213 |
| 2009/0231425 | A1 | 9/2009 | Zalewski |
| 2009/0265193 | A1 | 10/2009 | Collins |
| 2009/0279734 | A1 | 11/2009 | Brown |
| 2010/0042442 | A1 | 2/2010 | Seitomer |
| 2010/0174564 | A1 | 7/2010 | Stender |
| 2010/0194860 | A1 | 8/2010 | Mentz |
| 2011/0243450 | A1 | 10/2011 | Liu |
| 2012/0076437 | A1 | 3/2012 | King |
| 2012/0225988 | A1 | 9/2012 | Suau |
| 2012/0231424 | A1 | 9/2012 | Calman |
| 2012/0275651 | A1 * | 11/2012 | Brown ................. G06K 9/0063 382/103 |
| 2012/0294532 | A1 * | 11/2012 | Morris ................... G06F 16/29 382/195 |
| 2013/0004060 | A1 | 1/2013 | Bell |
| 2013/0233964 | A1 | 9/2013 | Woodworth et al. |
| 2013/0262029 | A1 * | 10/2013 | Pershing ................. G01B 21/28 702/156 |
| 2013/0326018 | A1 * | 12/2013 | Ryu ........................ H04L 67/10 709/217 |
| 2013/0346020 | A1 | 12/2013 | Pershing |
| 2014/0043436 | A1 * | 2/2014 | Bell ...................... H04N 13/204 348/46 |
| 2014/0099035 | A1 | 4/2014 | Ciarcia |
| 2014/0100889 | A1 | 4/2014 | Tofte et al. |
| 2014/0129261 | A1 | 5/2014 | Bothwell |
| 2014/0168420 | A1 | 6/2014 | Naderhirn et al. |
| 2014/0225988 | A1 | 8/2014 | Poropat |
| 2014/0267627 | A1 * | 9/2014 | Freeman ............. H04N 13/271 348/47 |
| 2014/0270492 | A1 | 9/2014 | Christopulos |
| 2014/0278060 | A1 | 9/2014 | Kordari |
| 2014/0278587 | A1 | 9/2014 | Plummer et al. |
| 2014/0297065 | A1 | 10/2014 | Tofte et al. |
| 2015/0012502 | A1 * | 1/2015 | Sensharma ........... G06F 16/283 707/691 |
| 2015/0025914 | A1 | 1/2015 | Lekas |
| 2015/0042640 | A1 | 2/2015 | Algreatly |
| 2015/0170287 | A1 * | 6/2015 | Tirone ................... G06Q 40/08 705/4 |
| 2015/0186953 | A1 | 7/2015 | Gross |
| 2015/0199824 | A1 * | 7/2015 | Kim .................... G06K 9/00355 382/103 |
| 2015/0269785 | A1 * | 9/2015 | Bell ....................... G06T 19/003 345/427 |
| 2015/0282766 | A1 * | 10/2015 | Cole ...................... A61B 5/4023 702/139 |
| 2015/0287142 | A1 * | 10/2015 | Brown ................. G06Q 40/08 705/4 |
| 2015/0294511 | A1 | 10/2015 | Nishioka |
| 2015/0332407 | A1 * | 11/2015 | Wilson, II .............. G06Q 40/08 705/4 |
| 2015/0348204 | A1 | 12/2015 | Daues |
| 2015/0379072 | A1 * | 12/2015 | Dirac .................... G06N 20/00 707/693 |
| 2015/0379423 | A1 * | 12/2015 | Dirac .................... G06N 20/00 706/12 |
| 2016/0048934 | A1 | 2/2016 | Gross |
| 2016/0055268 | A1 | 2/2016 | Bell |
| 2016/0088286 | A1 | 3/2016 | Forsythe et al. |
| 2016/0171622 | A1 | 6/2016 | Perkins et al. |
| 2016/0313736 | A1 | 10/2016 | Schultz |
| 2016/0323140 | A1 * | 11/2016 | Ponnuswamy ..... H04L 41/0813 |
| 2016/0343140 | A1 | 11/2016 | Ciprari |
| 2017/0169620 | A1 * | 6/2017 | Bleiweiss ................ G06T 3/20 |
| 2018/0046187 | A1 * | 2/2018 | Martirosyan ........... G06T 7/292 |
| 2018/0082414 | A1 * | 3/2018 | Rozenberg .............. G06T 7/001 |

OTHER PUBLICATIONS

Occipital Structure Sensor; accessed at http://structure.io/ on Aug. 23, 2016.

Google Project Tango; accessed at https://get.google.com/tango/ on Aug. 23, 2016.

\* cited by examiner

| Room Name | Feature | Room Type | Ceiling Type | Window Type | Window Subtype | Measurement | Material | Status | Estimate |
|---|---|---|---|---|---|---|---|---|---|
| Attic | | Box | Flat | Bay | Circle | | | | |
| Basement | | L-Shape | Sloped | Box | Flat Arch | | | | |
| Bathroom | | T-Shape | Peaked | Bow | Octagon | | | | |
| Bedroom | | U-Shape | Tray | Picture | Round | | | | |
| Closet | | | | Hung | Round Arch | | | | |
| Den | | | | Casement | Trapezoid | | | | |
| Dining Room | | | | | Triangle | | | | |
| Entryway | | | | | | | | | |
| Exercise Room | | | | | | | | | |
| Furnace Room | | | | | | | | | |
| Garage | | | | | | | | | |
| Great Room | | | | | | | | | |
| Hall | | | | | | | | | |
| Home Cinema | | | | | | | | | |
| Kitchen | | | | | | | | | |
| Laundry Room | | | | | | | | | |
| Living Room | | | | | | | | | |
| Nursery | | | | | | | | | |
| Office | | | | | | | | | |
| Pantry | | | | | | | | | |
| Sunroom | | | | | | | | | |
| Utility Room | | | | | | | | | |
| Workshop | | | | | | | | | |
| | Wall Height | | | | | 8'0" | | | |
| | Long Wall | | | | | 14'1" | Drywall, Paint | | |
| | Second Wall | | | | | 14'0" | Drywall, Paint | | |
| | 1st Wall Window | | | Picture | | 2'0" x 6'0" | Drywall, Paint | | |
| | 2nd Wall Window | | | Picture | | 6'8" x 6'0" | Double-Pane | Replace, Pane | 200 |
| | Third Wall | | | | | 2'0" | Double-Pane | | |
| | 3rd Wall Window | | | Picture | | 1'9" x 6'0" | Drywall, Paint | | |
| | Fourth Wall | | | | | 2'3" | Double-Pane | Replace, Pane + Frame | 900 |
| | 4th Wall Window | | | Picture | | 2'0" x 6'0" | Drywall, Paint | | |
| | Fifth Wall | | | | | 8'0" | Double-Pane | | |
| | Sixth Wall | | | | | 2'3" | Drywall, Paint | | |
| | Seventh Wall | | | | | 4'1" | Drywall, Paint | | |
| | Missing Wall | | | | | 14'0" | Drywall, Paint | | |
| | Floor Damage | | | | | 3'2" x 2'8" | Bamboo | Replace | 300 |
| | | | | | | | | TOTAL | 1400 |

FIG. 10

STRUCTURAL CHARACTERISTIC EXTRACTION FROM 3D IMAGES

CROSS-REFERENCE TO RELATED APPLICATIONS

This application is continuation of, and claims the benefit of, U.S. patent application Ser. No. 15/245,529, filed Aug. 24, 2016 and entitled "Structural Characteristic Extraction From 3D Images," which claims the benefit of priority to U.S. Provisional Patent Application No. 62/266,454, filed Dec. 11, 2015; U.S. Provisional Patent Application No. 62/290,215, filed Feb. 2, 2016; U.S. Provisional Patent Application No. 62/290,233, filed Feb. 2, 2016; and U.S. Provisional Patent Application No. 62/299,658, filed Feb. 25, 2016, the contents of which are hereby incorporated by reference, in their entirety and for all purposes, herein.

FIELD OF THE INVENTION

The present disclosure relates to photogrammetry and, more particularly, to network-based systems and methods for extracting structural characteristics of structures, rooms, objects, and/or features from three-dimensional images captured on a structural analysis computing device, and enabling a user to add other data to the extracted structural characteristics.

BACKGROUND

When a structure, such as a home, is damaged, the owner of the home may submit an insurance claim on an insurance policy associated with the home. The amount of the claim disbursement paid to the homeowner may correspond to an amount of damage, a nature of the damage, and/or an estimated cost to repair the damage. Accordingly, an agent of the associated insurance provider (e.g., a claims handler) may travel to the damaged home to assess the damage. The claims handler may sketch an illustration, such as a floor plan view, of each room that sustained damage. The sketching process may require that the claims handler manually obtain and record all necessary measurements of the room, then document (e.g., by taking photos) the room, including all damaged areas. The claims handler may additionally need to manually determine and document building materials and/or the nature of the damage.

At least some known systems permit the claims handler to manually input all documented data into a software platform configured to prepare an estimate for the claims disbursement (e.g., an estimate of a cost to repair the damage). For example, the claims handler may need to upload any photos, upload any sketches, manually enter room measurements, and manually enter any addition details (e.g., room name, room type, building materials, etc.). In addition, at least some known insurance software platforms may require the claims handler to generate new projects, manually enter information associated with an existing project, and/or manually enter information for each separate damaged room in a single project. Needless to say, the entire process may be time-consuming and laborious for the claims handler. Moreover, the longer the process takes for the claims handler, the longer it may take for the homeowner to receive their claim disbursement, which is disadvantageous for the homeowner and may lead to frustration. Any reduction in the time and/or labor involved in the claims handling process may be desirable.

BRIEF SUMMARY

The present embodiments may relate to systems and methods for capturing and analyzing three-dimensional (3D) images using mobile photogrammetry. A mobile photogrammetry system, as described herein, may include a structural analysis computing device that includes an object sensor configured to capture 3D images of a structure, room, object, and/or feature (collectively referred to herein as "object"). The object sensor may be configured to capture 3D images of the object and communicate those images to the structural analysis computing device for further processing. The structural analysis computing device may be configured to implement various software applications or platforms to analyze the captured 3D images, and may be configured to use the analysis thereof to generate, update, and/or handle claims on an insurance policy associated with the object.

In one aspect, a structural analysis computing device for determining structural characteristics of an object pictured in a three-dimensional (3D) image may be provided. The structural analysis computing device may include a memory, a user interface, an object sensor configured to capture the 3D image of the object, and/or at least one processor in communication with the memory and the object sensor. The at least one processor may be programmed to access the 3D image including the object, automatically determine a first plurality of measurements associated with the object from the 3D image, and display the 3D image on the user interface including the object and the first plurality of measurements. The at least one processor may be further programmed to generate a data file including the 3D image and the first plurality of measurements, and store the data file within the memory.

In another aspect, a computer-based method for extracting structural characteristics of an object pictured in a three-dimensional (3D) image may be provided. The method may be implemented using a structural analysis computing device including a memory, a user interface, an object sensor configured to capture the 3D image of the object, and at least one processor in communication with the memory and the object sensor. The method may include accessing the 3D image including the object, automatically extracting a first plurality of measurements associated with the object from the 3D image, and displaying the 3D image on the user interface including the object and the first plurality of measurements. The method may further include generating a data file including the 3D image and the first plurality of measurements, and storing the data file within the memory.

In yet another aspect, at least one non-transitory computer-readable storage media having computer-executable instructions embodied thereon may be provided. When executed by a structural analysis computing device including a memory, a user interface, an object sensor configured to capture the 3D image of an object, and at least one processor in communication with the memory and the object sensor, the computer-executable instructions may cause the at least one processor to access a 3D image including the object, automatically determine a first plurality of measurements associated with the object from the 3D image, and display the 3D image on the user interface including the object and the first plurality of measurements. The computer-executable instructions may also cause the at least one processor to generate a data file including the 3D image and the first plurality of measurements, and store the data file within the memory.

In a further aspect, a mobile photogrammetry system for generating an insurance claim associated with an object pictured in a three-dimensional (3D) image may be provided. The mobile photogrammetry system may include an insurance server computing device and a structural analysis computing device. The insurance server computing device may include a memory, and at least one processor in communication with the memory. The structural analysis computing device may include a memory, a user interface, an object sensor configured to capture the 3D image of the object, and at least one processor in communication with the memory and the object sensor. The at least one processor of the structural analysis computing device may be programmed to access the 3D image including the object, automatically determine a first plurality of measurements associated with the object from the 3D image, and display the 3D image on the user interface including the object and the first plurality of measurements. The at least one processor of the structural analysis computing device may also be programmed to generate a data file including the 3D image and the first plurality of measurements, and transmit the data file to the insurance server computing device in a claim generation signal. The claim generation signal may be configured to activate the insurance server computing device and cause the insurance server computing device to automatically generate an insurance claim form including information associated with the data file.

In a still further aspect, a computer-implemented method of estimating a repair or replacement cost may be provided. The method may include receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)). The method may also include determining or identifying, via the one or more processors, room (or home) features based upon computer analysis (such as via object recognition and/or optical character recognition techniques) of the 3D data from the 3D scanner, and determining or estimating, via the one or more processors, the type, dimensions, and/or manufacturer of the room features based upon computer analysis (such as via object recognition and/or optical character recognition techniques) of the 3D data from the 3D scanner. The method may further include determining or estimating, via the one or more processors, an extent of damage to the room and/or room features caused by the insurance-related event based upon computer analysis (such as via object recognition and/or optical character recognition techniques) of the 3D data from the 3D scanner, and determining, via the one or more processors, an estimated repair or replacement cost of the room and/or the room features based upon (i) the type, dimensions, and/or manufacturer of the room features, and/or (ii) the extent of damage to the room and/or room features caused by the insurance-related event determined, at least in part, from computer analysis of the 3D data of the room. The method may still further include transmitting, via the one or more processors (and/or associated transceivers, such as via wireless communication or data transmission), the estimated repair or replacement cost of the room and/or room features to a mobile device of a customer for their review, modification, or approval.

In another aspect, a computer-implemented method of estimating a repair or replacement cost may be provided. The method may include receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)). The method may also include determining, via the one or more processors, room dimensions of the room based upon computer analysis of the 3D data, and generating, via the one or more processors, a virtual depiction of the room based upon the 3D data and/or room dimensions determined from the 3D data, the virtual depiction of the room including the room dimensions superimposed on the virtual depiction of the room. The method may further include determining or identifying, via the one or more processors, room (or home) features based upon computer analysis (such as via object recognition and/or optical character recognition techniques) of the 3D data from the 3D scanner, and determining or estimating, via the one or more processors, the type, dimensions, and/or manufacturer of the room features based upon computer analysis (such as via object recognition and/or optical character recognition techniques) of the 3D data from the 3D scanner. The method may still further include determining or estimating, via the one or more processors, an extent of damage to the room and/or room features caused by the insurance-related event based upon computer analysis (such as via object recognition and/or optical character recognition techniques) of the 3D data from the 3D scanner. The method may also include determining, via the one or more processors, an estimated repair or replacement cost for the home, room, and/or room features based upon (i) the type, dimensions, and/or manufacturer of the room features, and/or (ii) the extent of damage caused by the insurance-related event determined, at least in part, from computer analysis of the 3D data of the room. The method may still further include transmitting, via the one or more processors (and/or associated transceivers, such as via wireless communication or data transmission), the estimated repair or replacement cost of the home, room, and/or room features to a mobile device of a customer for their review, modification, or approval.

In yet another aspect, a computer-implemented method of estimating a repair or replacement cost may be provided. The method may include receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)), and determining, via the one or more processors, room dimensions of the room based upon computer analysis of the 3D data. The method may also include determining or identifying, via the one or more processors, room (or home) features based upon computer analysis (such as object recognition and/or optical character recognition techniques) of the 3D data from the 3D scanner, and determining or estimating, via the one or more processors, the type, dimensions, and/or manufacturer of the room features based upon computer analysis (such as via object recognition and/or optical character recognition techniques) of the 3D data from the 3D scanner. The method may further include determining or estimating, via the one or more processors, an extent of damage to the home, room and/or room features caused by the insurance-related event based upon computer analysis (such as via object recognition and/or optical character recognition techniques) of the 3D data from the 3D scanner, and generating, via the one or more processors, a virtual depiction of the room based upon the 3D data and/or room dimensions determined from the 3D data, the virtual depiction of the room including (a) the room dimensions, and/or (b) type, dimensions, and/or manufacturer of the room features superimposed on the virtual depiction of the room, and (c) a graphical representative of the extent of damage to the home, room, and/or room features. The method may still further include determining, via the one or more processors, an estimated repair or replacement cost for the home, room, or room features based upon (i) the type, dimensions, and/or manufacturer of the room features, and/or (ii) the extent of damage caused by the insurance-related event determined, at least in part, from computer analysis of the 3D data of the room. The method may also include transmitting, via the one or more processors (and/or associated transceivers, such as via wireless communication or data transmission), the estimated repair or replacement cost of the home, room, and/or room features to a mobile device of a customer for their review, modification, or approval.

In one aspect, a computer-implemented method of estimating a repair or replacement cost may be provided. The method may include receiving, via one or more processors (and/or transceivers, such as via wireless communication or data transmission), 3D data (or 3D image data) of a room of a structure acquired or generated by a 3D laser or light (or other) scanner (such as a 3D scanner associated with a mobile device (e.g., smart phone or tablet)), and determining, via the one or more processors, room dimensions of the room based upon computer analysis of the 3D data. The method may also include generating, via the one or more processors, a virtual depiction of the room based upon the 3D and/or room dimensions determined from the 3D data, the virtual depiction of the room including the room dimensions superimposed on the virtual depiction of the room, and determining or identifying, via the one or more processors, room (or home) features based upon computer analysis (such as via object recognition and/or optical character recognition techniques) of the 3D data from the 3D scanner. The method may further include determining or estimating, via the one or more processors, the type, dimensions, and/or manufacturer of the room features based upon computer analysis (such as via object recognition and/or optical character recognition techniques) of the 3D data from the 3D scanner, and determining, via the one or more processors, an estimated repair or replacement cost of the home, room, and/or room features based upon the type, dimensions, and/or manufacturer determined, at least in part, from computer analysis of the 3D data of the room.

In a further aspect, a computer-implemented method of estimating a repair or replacement cost may be provided. The method may include receiving, via one or more processors (and/or associated transceivers, such as via wireless communication or data transmission), 3D data (or 3D image data) of a personal article (or personal belonging) acquired via, or generated by, a 3D laser or light (or other) scanner (such as a 3D scanner associated with a mobile device (e.g., smart phone or tablet)). The method may also include determining or identifying, via the one or more processors, (i) the personal article, and/or (ii) features of the personal article based upon computer analysis (such as object recognition and/or optical character recognition techniques) of the 3D data from the 3D scanner (for instance by comparing the 3D data of the personal article with a virtual catalog known items), and determining or estimating, via the one or more processors, the type and/or manufacturer of the personal article based upon computer analysis (such as object recognition and/or optical character recognition techniques) of the 3D data from the 3D scanner. The method may also include determining, via the one or more processors, an estimated repair or replacement cost for the personal article based upon (i) the personal article, (ii) features of the personal article, (iii) type of the personal article, and/or (iv) manufacturer of the personal article determined, at least in part, from computer analysis of the 3D data of the room.

In another aspect, a computer-implemented method of estimating a repair or replacement cost may be provided. The method may include receiving, via one or more processors (and/or associated transceivers, such as via wireless communication or data transmission), 3D data (or 3D image data) of a vehicle after an insurance-related event has occurred (e.g., event that causes body, fire, smoke, water, hail, wind, or other damage to the vehicle) that is acquired or generated by a 3D laser or light (or other) scanner (such as a 3D scanner associated with a mobile device (e.g., smart phone or tablet)). The method may also include determining or identifying, via the one or more processors, a type of vehicle, vehicle manufacturer, vehicle age, and/or vehicle features based upon computer analysis (such as via object recognition and/or optical character recognition techniques) of the 3D data from the 3D scanner, and determining or estimating, via the one or more processors, an extent of damage to the vehicle or vehicle features caused by the insurance-related event based upon computer analysis (such as via object recognition and/or optical character recognition techniques) of the 3D data from the 3D scanner (such as determining dimensions of body damage, number of windows damaged, number of hail dents in the body, size of each hail dent in the body of the vehicle, etc.). The method may further include determining, via the one or more processors, an estimated repair or replacement cost of the vehicle and/or the vehicle features based upon (i) the type of vehicle, vehicle features, and vehicle manufacturer, and/or (ii) the extent of damage to the vehicle and/or vehicle features caused by the insurance-related event determined, at least in part, from computer analysis of the 3D data of the room. The method may still further include transmitting, via the one or more processors (and/or associated transceivers, such as via wireless communication or data transmission), the estimated repair or replacement cost of the vehicle and/or vehicle features to a mobile device of a customer for display and their review, modification, or approval.

In a still further aspect, a computer-implemented method of estimating a repair or replacement cost may be provided. The method may include receiving, via one or more processors (and/or associated transceivers, such as via wireless communication or data transmission), 3D data (or 3D image data) of a vehicle acquired via, or generated by, a 3D laser or light (or other) scanner (such as a 3D scanner associated with a mobile device (e.g., smart phone or tablet)). The method may also include determining or identifying, via the one or more processors, (i) the vehicle, and/or (ii) features of the vehicle based upon computer analysis (such as object recognition and/or optical character recognition techniques) of the 3D data from the 3D scanner (for instance by comparing the 3D data of the vehicle with a virtual catalog known vehicles). The method may further include determining or estimating, via the one or more processors, the type and/or manufacturer of the vehicle based upon computer analysis (such as object recognition and/or optical character recognition techniques) of the 3D data from the 3D scanner, and determining, via the one or more processors, an estimated repair or replacement cost for the vehicle based upon (i) the vehicle, (ii) features of the vehicle, (iii) type of vehicle, and/or (iv) manufacturer of the vehicle determined, at least in part, from computer analysis of the 3D data of the room.

In yet another aspect, a computer system for estimating a repair or replacement cost may be provided. The computer system may include one or more processors and/or transceivers configured to receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)). The processors and/or transceivers may also be configured to determine or identify room (or home) features based upon computer analysis (such as via object recognition and/or optical character recognition techniques) of the 3D data from the 3D scanner, and determine or estimate the type, dimensions, and/or manufacturer of the room features based upon computer analysis (such as via object recognition and/or optical character recognition techniques) of the 3D data from the 3D scanner. The processors and/or transceivers may further be configured to determine or estimate an extent of damage to the room and/or room features caused by the insurance-related event based upon computer analysis (such as via object recognition and/or optical character recognition techniques) of the 3D data from the 3D scanner, and determine an estimated repair or replacement cost of the room and/or the room features based upon (i) the type, dimensions, and/or manufacturer of the room features, and/or (ii) the extent of damage to the room and/or room features caused by the insurance-related event determined, at least in part, from computer analysis of the 3D data of the room. The processors and/or transceivers may still further be configured to transmit, via wireless communication or data transmission, the estimated repair or replacement cost of the room and/or room features to a mobile device of a customer for display and their review, modification, or approval.

In one aspect, a computer system for estimating a repair or replacement cost may be provided. The computer system may include one or more processors and/or transceivers configured to receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)). The processors and/or transceivers may also be configured to determine room dimensions of the room based upon computer analysis of the 3D data, and generate a virtual depiction of the room based upon the 3D data and/or room dimensions determined from the 3D data, the virtual depiction of the room including the room dimensions superimposed on the virtual depiction of the room. The processors and/or transceivers may further be configured to determine or identify room (or home) features based upon computer analysis (such as via object recognition and/or optical character recognition techniques) of the 3D data from the 3D scanner, and determine or estimate the type, dimensions, and/or manufacturer of the room features based upon computer analysis (such as via object recognition and/or optical character recognition techniques) of the 3D data from the 3D scanner. The processors and/or transceivers may still further be configured to determine or estimate an extent of damage to the room and/or room features caused by the insurance-related event based upon computer analysis (such as via object recognition and/or optical character recognition techniques) of the 3D data from the 3D scanner. The processors and/or transceivers may also be configured to determine an estimated repair or replacement cost for the home, room, and/or room features based upon (i) the type, dimensions, and/or manufacturer of the room features, and/or (ii) the extent of damage caused by the insurance-related event determined, at least in part, from computer analysis of the 3D data of the room, and transmit, via wireless communication or data transmission, the estimated repair or replacement cost of the home, room, and/or room features to a mobile device of a customer for their review, modification, or approval.

In another aspect, a computer system for estimating a repair or replacement cost may be provided. The computer system may include one or more processors and/or transceivers configured to receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)). The processors and/or transceivers may also be configured to determine room dimensions of the room based upon computer analysis of the 3D data, determine or identify room (or home) features based upon computer analysis (such as object recognition and/or optical character recognition techniques) of the 3D data from the 3D scanner, and determine or estimate the type, dimensions, and/or manufacturer of the room features based upon computer analysis (such as via object recognition and/or optical character recognition techniques) of the 3D data from the 3D scanner. The processors and/or transceivers may further be configured to determine or estimate an extent of damage to the home, room and/or room features caused by the insurance-related event based upon computer analysis (such as via object recognition and/or optical character recognition techniques) of the 3D data from the 3D scanner. The processors and/or transceivers may be still further configured to generate a virtual depiction of the room based upon the 3D data and/or room dimensions determined from the 3D data, the virtual depiction of the room including (a) the room dimensions, and/or (b) type, dimensions, and/or manufacturer of the room features superimposed on the virtual depiction of the room, and (c) a graphical representative of the extent of damage to the home, room, and/or room features, and determine an estimated repair or replacement cost for the home, room, or room features based upon (i) the type, dimensions, and/or manufacturer of the room features, and/or (ii) the extent of damage caused by the insurance-related event determined, at least in part, from computer analysis of the 3D data of the room. The processors and/or transceivers may also be configured to transmit, via wireless communication or data transmission, the estimated repair or replacement cost of the home, room, and/or room features to a mobile device of a customer for their review, modification, or approval.

In yet another aspect, a computer system for estimating a repair or replacement cost may be provided. The computer system may include one or more processors and/or transceivers configured to receive, via wireless communication or data transmission, 3D data (or 3D image data) of a room of a structure acquired or generated by a 3D laser or light (or other) scanner (such as a 3D scanner associated with a mobile device (e.g., smart phone or tablet)), determine room dimensions of the room based upon computer analysis of the 3D data, and generate a virtual depiction of the room based upon the 3D and/or room dimensions determined from the 3D data, the virtual depiction of the room including the room dimensions superimposed on the virtual depiction of the room. The processors and/or transceivers may also be configured to determine or identify room (or home) features based upon computer analysis (such as via object recognition and/or optical character recognition techniques) of the 3D data from the 3D scanner, determine or estimate the type, dimensions, and/or manufacturer of the room features based upon computer analysis (such as via object recognition and/or optical character recognition techniques) of the 3D data from the 3D scanner, and/or determine an estimated repair or replacement cost of the home, room, and/or room features based upon the type, dimensions, and/or manufacturer determined, at least in part, from computer analysis of the 3D data of the room.

In a further aspect, a computer system for estimating a repair or replacement cost may be provided. The computer system may include one or more processors and/or transceivers configured to receive, via wireless communication or data transmission, 3D data (or 3D image data) of a personal article (or personal belonging) acquired via, or generated by, a 3D laser or light (or other) scanner (such as a 3D scanner associated with a mobile device (e.g., smart phone or tablet)). The processors and/or transceivers may also be configured to determine or identify (i) the personal article, and/or (ii) features of the personal article based upon computer analysis (such as object recognition and/or optical character recognition techniques) of the 3D data from the 3D scanner (for instance by comparing the 3D data of the personal article with a virtual catalog known items), and determine or estimate the type and/or manufacturer of the personal article based upon computer analysis (such as object recognition and/or optical character recognition techniques) of the 3D data from the 3D scanner. The processors and/or transceivers may be further configured to determine an estimated repair or replacement cost for the personal article based upon (i) the personal article, (ii) features of the personal article, (iii) type of the personal article, and/or (iv) manufacturer of the personal article determined, at least in part, from computer analysis of the 3D data of the room.

In a still further aspect, a computer system for determining a repair and/or replacement cost of a vehicle may be provided. The computer system may include one or more processors and/or transceivers configured to receive, such as via wireless communication or data transmission, 3D data (or 3D image data) of a vehicle after an insurance-related event has occurred (e.g., event that causes body, fire, smoke, water, hail, wind, or other damage to the vehicle) that is acquired or generated by a 3D laser or light (or other) scanner (such as a 3D scanner associated with a mobile device (e.g., smart phone or tablet)). The processors and/or transceivers may also be configured to determine or identify a type of vehicle, vehicle manufacturer, vehicle age, and/or vehicle features based upon computer analysis (such as via object recognition and/or optical character recognition techniques) of the 3D data from the 3D scanner, and determine or estimate an extent of damage to the vehicle or vehicle features caused by the insurance-related event based upon computer analysis (such as via object recognition and/or optical character recognition techniques) of the 3D data from the 3D scanner (such as determining dimensions of body damage, number of windows damaged, number of hail dents in the body, size of each hail dent in the body of the vehicle, etc.). The processors and/or transceivers may be further configured to determine an estimated repair or replacement cost of the vehicle and/or the vehicle features based upon (i) the type of vehicle, vehicle features, and vehicle manufacturer, and/or (ii) the extent of damage to the vehicle and/or vehicle features caused by the insurance-related event determined, at least in part, from computer analysis of the 3D data of the room, and transmit, such as via wireless communication or data transmission, the estimated repair or replacement cost of the vehicle and/or vehicle features to a mobile device of a customer for display and their review, modification, or approval.

In yet another aspect, a computer system for estimating a repair or replacement cost may be provided. The computer system may include one or more processors and/or transceivers configured to receive, such as via wireless communication or data transmission, 3D data (or 3D image data) of a vehicle acquired via, or generated by, a 3D laser or light (or other) scanner (such as a 3D scanner associated with a mobile device (e.g., smart phone or tablet)). The processors and/or transceivers may also be configured to determine or identify (i) the vehicle, and/or (ii) features of the vehicle based upon computer analysis (such as object recognition and/or optical character recognition techniques) of the 3D data from the 3D scanner (for instance by comparing the 3D data of the vehicle with a virtual catalog known vehicles). The processors and/or transceivers may be further configured to determine or estimate the type and/or manufacturer of the vehicle based upon computer analysis (such as object recognition and/or optical character recognition techniques) of the 3D data from the 3D scanner, and determine an estimated repair or replacement cost for the vehicle based upon (i) the vehicle, (ii) features of the vehicle, (iii) type of vehicle, and/or (iv) manufacturer of the vehicle determined, at least in part, from computer analysis of the 3D data of the room.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 10 illustrates an exemplary data file used in the mobile photogrammetry system shown in FIG. 1;

Figure 1:
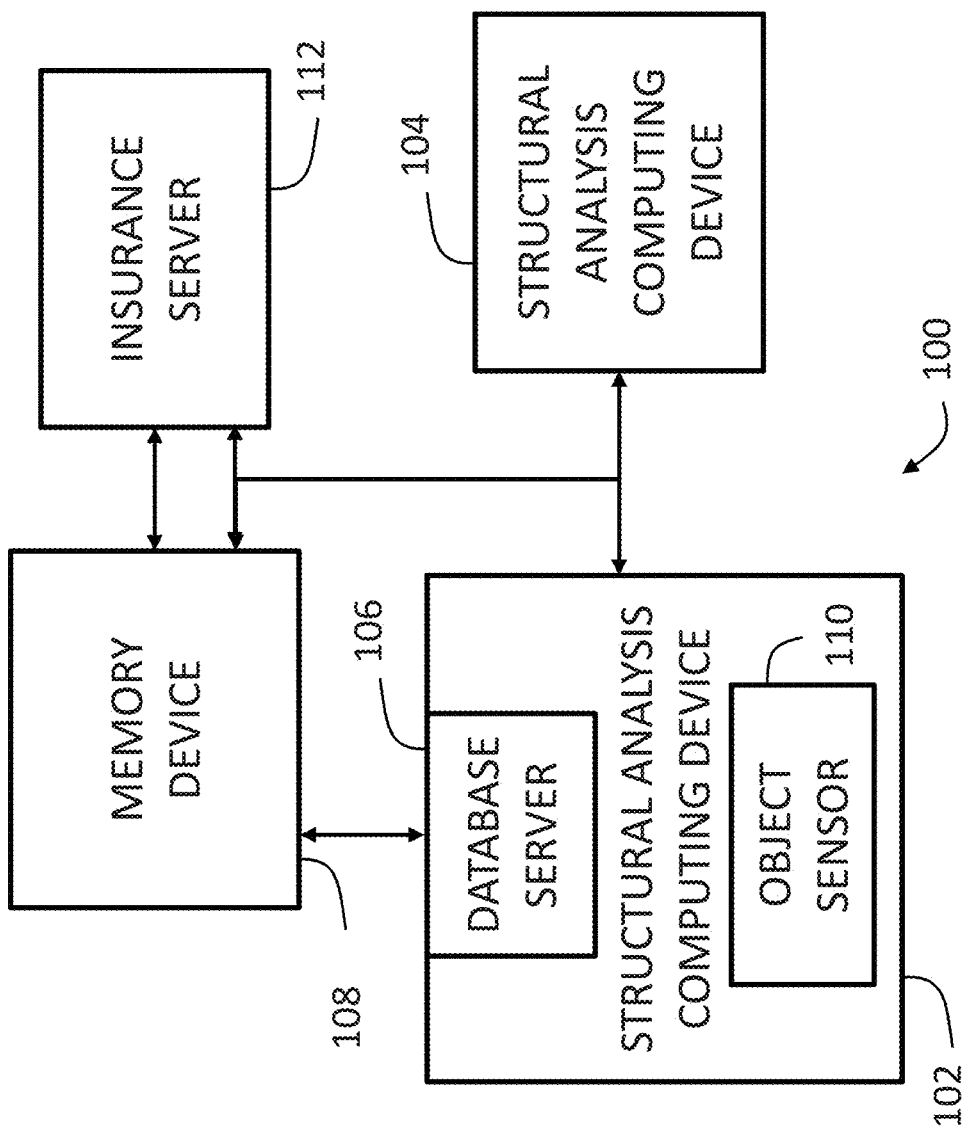
FIG. 1 depicts a schematic view of an exemplary mobile photogrammetry computer system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for extracting structural characteristics of a structure using three-dimensional (3D) images, for example, using photogrammetry. Photogrammetry refers to the use of photography to measure distances between or features of objects. The mobile photogrammetry system described herein may include a structural analysis computing device configured to perform automatic analysis of the 3D images. The structural analysis computing device may include an object sensor and at least one processor in communication with a memory. The object sensor, which may be integral to and/or coupled to the structural analysis computing device, is configured to capture one or more 3D images of the object (e.g., a building, a home, a room, and/or feature thereof).

The structural analysis computing device may be configured to implement a structural analysis software platform to automatically analyze the captured 3D images, as described herein. The structural analysis computing device may be further configured to implement a claim evaluation software platform to evaluate the analyzed images for insurance claim disbursement purposes. In some embodiments, the memory may include one or more storage devices, including cloud storage devices, internal memory devices, non-centralized databases, and/or combinations thereof.

In addition, although the analysis and evaluation are described herein as being performed by a single computing device, it should be understood that more than one computing device may perform the various actions and steps described herein. For example, the structural analysis software platform may be implemented by one computing device and the claim evaluation software platform may be implemented by another computing device without departing from the scope of the present disclosure.

In one exemplary embodiment, a user (e.g., a homeowner or other user associated with the structure, a claims handler, etc.) may access a structural analysis software application or platform on their structural analysis computing device. The structural analysis computing device may include, for example, a mobile phone, a smart phone, a tablet, a laptop computer, a dedicated structural analysis computing device, etc. In the exemplary embodiment, the structural analysis computing device may be a mobile computing device, such that the structural analysis computing device may be relatively easily transported to the structure(s) being analyzed and relatively easily maneuvered and manipulated within the structure(s). The structural analysis software platform may include 3D photogrammetry capability.

Accordingly, the structural analysis software platform may be configured to analyze 3D images of a structure, rooms therein, features thereof, and/or contents therein. For example, the structural analysis software platform may be configured to analyze 3D images of buildings, rooms, objects (e.g., televisions, appliances, etc.), people, inventories, and/or other suitable subjects, as described further herein.

The user may input a number of elements into the structural analysis software platform to initialize, describe, and/or identify the subject of the images to be captured and analyzed. The structural analysis software platform may prompt such input, for example, by displaying fields (e.g., text fields, drop-down lists, selection boxes, etc.) labelled to request particular information from the user. For example, in one case in which the user is capturing images of a room as part of a claims submission and/or handling process, the user may input an identification of an object. An "object" may refer to any subject of an image, such as a structure, (e.g., a home or other building), a room (e.g., a living room, kitchen, etc.), and/or a particular feature that may have been damaged.

In other words, the user may input project identifier(s), room identifier(s), and/or claim identifier(s). This information may include a claim number, a policy number of an insurance policy associated with the structure and/or the user, a policyholder name or other identifier, a room type, room features (e.g., ceiling type, window type, door type, staircase, building materials, etc.), location of damage, and/or any other required (e.g., by the structural software platform) or recommended data.

The user may then use the object sensor coupled to and/or integral to their structural analysis computing device, as described herein, to capture one or more 3D images of the object, of interest (e.g., the structure, room, object, and/or feature that has been damaged and for which a claim is being submitted and/or handled). The user may capture one or more 3D images, for example, at different angles, at different distances from a feature or room, and/or at different orientations (e.g., landscape, portrait, horizontal, vertical, panorama, etc.), in order to capture an entirety of the structure, room, object, and/or feature of interest.

The structural analysis platform may be configured to analyze the captured 3D images. Such analysis may include automatically extracting wall-to-wall (i.e., wall length) and/or ceiling-to-floor (i.e., wall height) measurements of the room. In some embodiments, the structural analysis software platform may be configured to automatically extract additional measurements, for example, of doorways, windows, missing wall lengths, missing wall heights, and/or other features.

Additionally or alternatively, as described further herein, the user may instruct the structural analysis software platform to extract additional measurements. The structural analysis software platform may be configured to display one or more of the 3D image(s) on a display device (e.g., screen) of the structural analysis computing device. In the exemplary embodiment, the structural analysis software platform may be configured to display one or more of the automatically extracted measurements on the displayed 3D image(s) for review.

The user may then review the displayed 3D images including the automatically extracted (e.g., wall-to-wall and/or ceiling-to-floor) measurements. The structural analysis software platform may facilitate display of the 3D images to the user such that user may manipulate the displayed 3D images. For example, the user may rotate the 3D image, may zoom in, and/or may zoom out to change a displayed view. In some embodiments, the user may determine that additional measurements are needed in order to fully analyze or assess the damage to the structure. For example, the user may determine that a particular feature of the room, such as a set of cabinetry or a bay of windows, needs repair or replacement. Accordingly, the damaged feature(s) may need to be measured in order to accurately generate an estimated repair or replacement cost (e.g., a claim disbursement amount).

The user may instruct the structural analysis software platform to extract any additional measurements. The structural analysis software platform may be configured to receive user input from the user from an input device of the structural analysis computing device (e.g., a mouse, keyboard, touch screen interface, etc.). The user may use the input device to input the instructions to extract the additional measurements. In one exemplary embodiment, the structural analysis software platform may accept "point and click" input. More specifically, the user may select a particular distance to be measured by selecting (e.g., clicking, tapping, hovering over, etc.) a first input location on the displayed 3D image corresponding to a first end of the desired additional measurement. This first input location received by the structural analysis software platform from the input device may represent a first physical location, such as the physical location of a first end of the set of cabinets or a first end of the bay of windows. The user may then select a second input location on the displayed 3D image, spaced apart from the first input location, corresponding to a second end of the desired additional measurement. This second input location received by the structural analysis software platform from the input device may represent a second physical location, such as the physical location of a second end of the set of cabinets of a second end of the bay of windows. The structural analysis software platform may then determine a first distance between the first and second input locations, and, accordingly, extract a second distance corresponding to the physical distance between the first and second physical locations. This second distance may be displayed as the requested additional measurement.

The user may request any number of additional measurements. In alternative embodiments, the structural analysis software platform may accept instructions to extract additional measurements according to any other method, for example, using pixel coordinates or an alternative syntax to input opposing ends of the requested additional measurements. Once the user is satisfied that any necessary measurements have been extracted, the user may instruct the structural analysis software platform to complete the user input process and export the image and any extracted measurements. For example, the user may select a "Complete and Export" command on a user interface of the structural analysis software platform.

The structural analysis software platform may be configured to generate a data file including the 3D image(s) and any extracted measurements. In one exemplary embodiment, the generated data file is formatted as an Extensible Markup Language (XML) data file. The data file may include any other data input by the user and/or extracted by the structural analysis software platform, including any claim, structure, and/or room identifiers, comments, features, objects, building materials, and/or any other data.

The structural analysis software platform may be configured to export the data file. Exporting may include storing the data file in a memory, transmitting the data file to another software platform, and/or transmitting the data file to another computing device. For example, the structural analysis software platform may be configured to export the data file to a claim evaluation software platform installed on and/or implemented by the structural analysis computing device. The claim evaluation software platform may be configured to use data from the data file to determine a location, nature, and/or extent of any damage to the object captured in the 3D image(s).

The claim evaluation software platform may initially review the claim, object, and/or room identifier(s). For example, in one embodiment, the claim evaluation software platform may be configured to review the claim identifier to determine whether a project (e.g., a completed or ongoing set of analyses and/or evaluations associated with the claim, object, and/or policyholder) associated with the claim, object, and/or policyholder already exists. If no such project exists, the claim evaluation software platform may automatically generate a new project associated with at least one of the claim identifier, the object identifier, the room identifier, and/or the policyholder. Upon generation of the new project, the claim evaluation software platform may automatically review, verify, and/or validate any data in the received data file, and may automatically populate any project field corresponding to the data in the received data file.

If a project associated with the claim, object, and/or policyholder does exist, the claim evaluation software platform may be configured to additionally determine whether a sub-project associated with the room identifier exists. If no such sub-project exists, the claim evaluation software platform may be configured to automatically generate a room sub-project and automatically populated any sub-project field corresponding to the data in the received data file. If a sub-project associated with the room identifier does exist, the claim evaluation software platform may be configured to determine whether the data file contains any new and/or conflicting information from the data in the existing sub-project. The claim evaluation software platform may update any sub-project fields corresponding to the new and/or conflicting information.

Upon automatic generation of any new project and/or sub-project, the claim evaluation software platform may be configured to store the project and/or sub-project in a memory. In one embodiment, the memory includes a cloud storage memory device such that the project and/or sub-project may be accessed by multiple parties and/or from multiple locations. In some embodiments, when the claim evaluation software platform updates an existing project and/or sub-project with new or updated data, the claim evaluation software platform may be configured to store the updated project and/or sub-project in the memory. Additionally or alternatively, the claim evaluation software platform may be configured to store a record of the update in the memory.

To analyze the data in a project and/or sub-project for claim evaluation, the user may access the claim evaluation software platform, which may be configured to retrieve the corresponding stored project and/or sub-project from the memory. The user may then instruct the claim evaluation software platform to analyze the data in the project and/or sub-project and generate a claim evaluation. The claim evaluation software platform may be configured to analyze the data to determine a location, nature, and/or extent of the damage. For example, the claim evaluation software platform may determine that a set of cabinets and a cooktop in a kitchen have been damaged in a fire. The claim evaluation software platform may determine that an entire cabinet base must be replaced, that two cabinet doors must be replaced, and that the cooktop must be cleaned.

In some embodiments, the user may input certain information into the claim evaluation software platform to supplement these determinations. For example, the user may input whether the nature of the damage requires cleaning, repair, replacement, and/or abatement.

In addition, the claim evaluation software platform may be configured to analyze the 3D images taken and additional information stored in the memory to generate an insurance claim evaluation. The claim evaluation software may be configured to determine an amount of loss (e.g., a claim disbursement amount) and/or the nature and amount of work (e.g., repair, replacement, abatement, cleaning, etc.) needed to address the claim. Continuing with the same example, the claim evaluation software platform may be configured to analyze the 3D images to determine that the base cabinets and cabinet doors are fabricated from a particular material that carries a particular replacement and/or repair cost. The claim evaluation software platform may use the additional stored information to further determine an average, typical, expected, minimum, and/or maximum cost of cooktop cleaning due to fire damage. For example, the claim evaluation software platform may access a database of materials, costs, past claims, and/or other information to make such determinations.

The claim evaluation software platform may then generate the claim evaluation including a claim disbursement amount based upon the above determinations. The claim evaluation software platform may display the claim evaluation for review by the user. Additionally or alternatively, the claim evaluation software platform may be configured to transmit the claim evaluation for review by another party. For example, the mobile computing device may transmit the claim evaluation to a third-party computing device such as a computing device associated with an insurance provider (e.g., a claims computer system). The claim evaluation may be reviewed such that the claim disbursement amount may be transmitted to a homeowner or other user associated with the damaged structure, room, object, and/or feature.

At least one of the technical problems addressed by this system may include: (i) time-consuming, difficult, and/or laborious manual illustration of structures; (ii) manual measurement of structures, features thereof, and/or contents therein; and/or (iii) inaccessible or non-intuitive platforms involving manual data entry and/or manipulation and/or manual project generation.

A technical effect of the systems and processes described herein may be achieved by performing at least one of the following steps: (a) accessing a 3D image including an object; (b) automatically determining and/or extracting a first plurality of measurements of the object from the 3D image; (c) displaying the 3D image on a user interface including the object and the first plurality of measurements; (d) generating a data file including the 3D image and the first plurality of measurements; and (e) storing the data file within a memory.

The technical effect achieved by this system may be at least one of: (i) reduced time and effort in capturing images of structures; (ii) automated and/or simplified measurement of structures using a captured three-dimensional image; (iii) automated and/or simplified import and extraction of data necessary to automatically populate and/or generate projects; (iv) more accurate estimated sizing and/or measurement of structures, and thus more accurate risk determination, and/or replacement or repair cost estimation or determination; (v) improved speed in generating, processing, and/or issuing claims and/or claim disbursements after an insurance claim event; and/or (vi) more accurate replacement or repair material cost determination and ordering.

Exemplary Mobile Photogrammetry Computer System

FIG. 1 depicts a schematic view of an exemplary mobile photogrammetry computer system 100. In one exemplary embodiment, system 100 may include one or more structural analysis computing device(s) 102, 104. Structural analysis computing device 102, 104 may be any device capable of interconnecting to the Internet including a mobile computing device or "mobile device," such as a smartphone, a personal digital assistant (PDA), a tablet, a wearable device (e.g., a "smart watch" or a personal projection device such as "smart glasses"), a "phablet," or other web-connectable equipment or mobile devices. Two structural analysis computing devices 102, 104 are shown to exemplify that the processes, methods, steps, and/or actions performed herein, though generally described as being performed on a single structural analysis computing device 102, may be performed multiple structural analysis computing devices 102, 104. Accordingly, where any functionality is described as being performed by structural analysis computing device 102, it should be understood that the functionality may be performed in part or in whole by structural analysis computing device 104.

Additionally, a database server 106 may be connected to a memory device 108 containing information on a variety of matters, as described below in greater detail. In one exemplary embodiment, memory device 108 may include a cloud storage device, such that information stored thereon may be accessed by any of structural analysis computing devices 102, 104 (and/or an insurance server 112) from any location. In one embodiment, memory device 108 may be stored on structural analysis computing device 102, 104. In any alternative embodiment, memory device 108 may be stored remotely from structural analysis computing device 102, 104 and may be non-centralized. Moreover, in any alternative embodiment, memory device 108 may be stored on an insurance server 112, as described further herein.

In one exemplary embodiment, structural analysis computing device 102 may include an object sensor 110, as described further herein. Object sensor 110 may be coupled to structural analysis computing device 102. In some embodiments, object sensor 110 may be externally attached by a bracket, clip, elastic, magnet, and/or adhesive to structural analysis computing device 102. In other embodiments, object sensor 110 may be integral to structural analysis computing device 102, for example, coupled to structural analysis computing device 102 internal to a housing or case (not shown) of structural analysis computing device 102. Object sensor 110 may be configured to capture one or more three-dimensional (3D) images of a structure and/or of any other subject, such a room, object, and/or feature of the structure, and/or, in some embodiments, a person (collectively referred to herein as "object").

Structural analysis computing device 102 may be configured to implement one or more software platforms, as described further herein, to analyze the captured 3D images. Structural analysis computing device 102 may be further configured to generate a data file including the results of that analysis and the analyzed 3D images. Structural analysis computing device 102 may transmit the data file to memory device 108 for storage and/or for access to the data file by one or more other computing devices (e.g., structural analysis computing device 104 and/or insurance server 112). Structural analysis computing device 102 may be further configured to use the results of the analysis to perform various other functions. For example, structural analysis computing device may evaluate the 3D images and/or the analysis thereof in an insurance claims generation and/or handling process, to generate an insurance claim associated with damage to the object pictured in the 3D images. Structural analysis computing device 102 may be further configured to retrieve reference information from memory device 108 to perform analysis and/or evaluation of any of the above-described information.

In one exemplary embodiment, mobile photogrammetry system 100 may further include an insurance server 112, which may be in communication with structural analysis computing device 102, structural analysis computing device 104, and/or memory device 108. Insurance server 112 may be associated with and/or maintained by an insurance provider. Insurance server 112 may provide reference information to memory device 108, such as, for example, policy information (e.g., policy amount, premium, discount) associated with a particular object; historical informational and/or or images associated with a particular object; past claims involving the object or a user associated with the object; propriety underwriting information associated with the object and/or a corresponding policy; past claims information including past disbursement amount associated with particular damage, repair, and/or replacement; and/or other damage, repair, replacement, and/or abatement information including costs associated therewith.

Additionally or alternatively, insurance server 112 may retrieve any information generated and/or stored by structural analysis computing device 102. For example, insurance server 112 may receive the data file including the 3D images and associated analyses thereof, and may store the data file (e.g., in memory device 108 and/or in another memory, not shown) for future reference. Insurance server 112 may further receive a claim generated by structural analysis computing device 102. Insurance server 112 may use the generated claim to disburse a claim disbursement amount, and/or to update and/or adjust an existing insurance policy corresponding to the claim.

Exemplary Structural Analysis Computing Device

Figure 2:
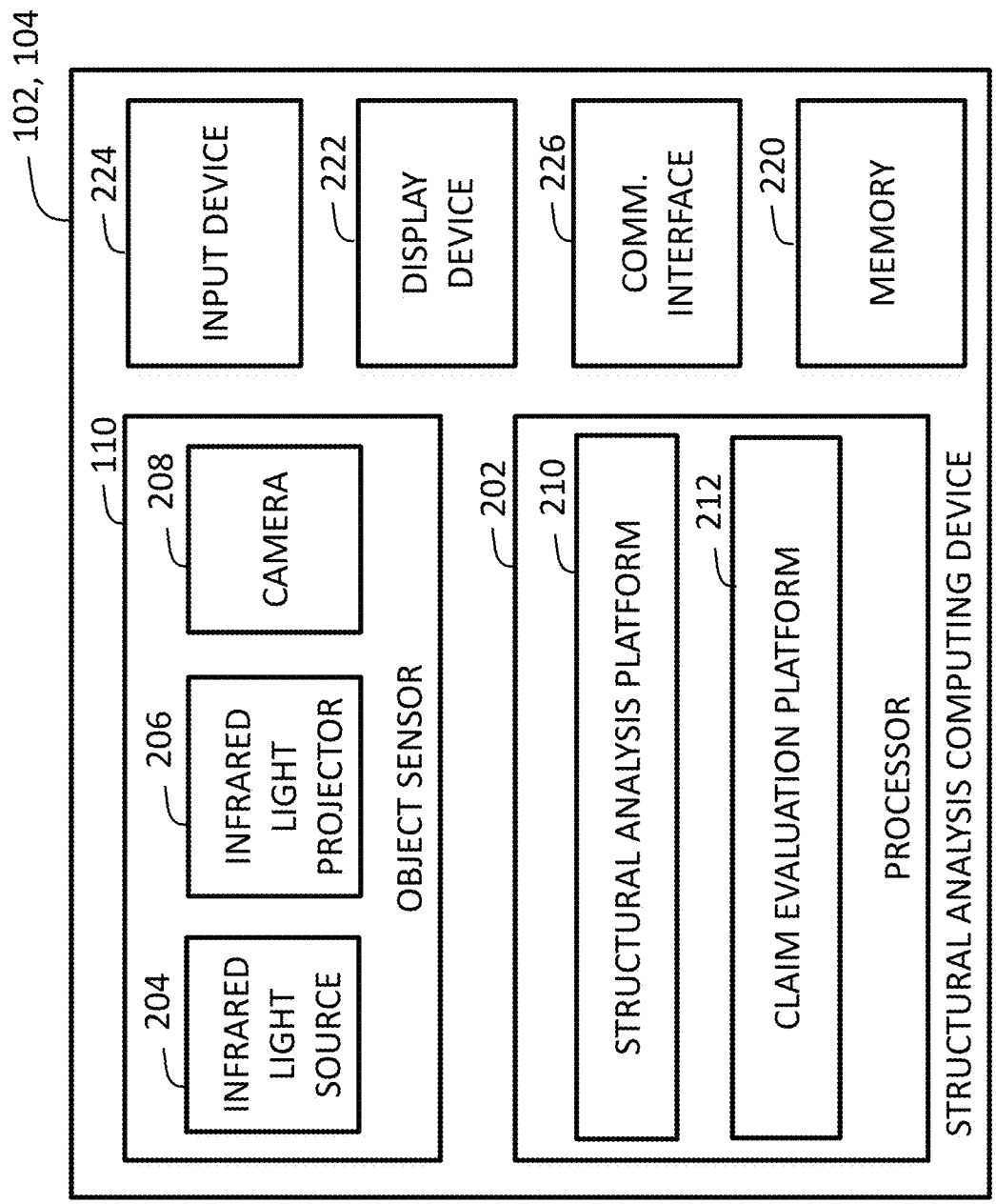
FIG. 2 depicts a schematic view of an exemplary structural analysis computing device used in the mobile photogrammetry system shown in FIG. 1.

FIG. 2 depicts a schematic view of an exemplary structural analysis computing device 102, 104 (as shown in FIG. 1) used in mobile photogrammetry system 100 (also shown in FIG. 1). Structural analysis computing device 102, 104 (referred to herein as "structural analysis computing device 102" for simplicity) may include an object sensor 110 and at least one processor 202 for executing instructions. In some embodiments, executable instructions may be stored in a memory area 220 (which may include and/or be similar to memory device 108, shown in FIG. 1). Processor 202 may include one or more processing units (e.g., in a multi-core configuration). Memory area 220 may be any device allowing information such as executable instructions and/or other data to be stored and retrieved. Memory area 220 may include one or more computer-readable media.

As described above, object sensor 110 may by coupled to and/or integral to structural analysis computing device 102. Object sensor 110 may include at least one infrared light source 204, an infrared light projector 206, and/or an infrared camera 208. The at least one infrared light source 204 may include, for example, one or more infrared LEDs and/or any other suitable infrared light sources. Infrared light projector 206 is configured to cast or project light output from infrared light source(s) 204 in a structured pattern (e.g., as a pattern of beams or dots). Infrared camera 208 may include any suitable infrared camera and/or any components or accessories necessary to transform an existing camera (not shown) integral to structural analysis computing device 102 into an infrared camera (e.g., additional lenses, processing equipment, etc.). Infrared camera 208 may be configured to capture images including the projected, structured light. By processing variations in the structured light of these images (e.g., using processor 202 and/or a processor (not shown) included in object sensor 110), three-dimensional (3D) images may be generated. Accordingly, object sensor 110 may be able to capture 3D images.

Processor 202 may be configured to receive these captured 3D images from object sensor 110. In addition, processor 202 may be configured to download, install, and/or implement a plurality of software applications or platforms. In one exemplary embodiment, processor 202 is configured to implement a structural analysis software platform 210 and a claim evaluation software platform 212.

Structural analysis software platform 210 may be configured to process the received 3D images. Structural analysis software platform 210 may include 3D photogrammetry capability, such that structural analysis software platform 210 may process and interpret the dimensionality and features of the 3D images, including detecting types of materials that the object(s) of the 3D images are made of and/or an amount of damage thereto. Accordingly, structural analysis software platform 210 may be configured to analyze 3D images of an object, such as a structure, rooms therein, features thereof, and/or contents therein (e.g., televisions, appliances, etc., people, inventories, and/or other suitable objects).

Structural analysis software platform 210 may be configured to receive a plurality of data elements to initialize, describe, and/or identify the object picture in the 3D images. Structural analysis software platform 210 may prompt such input, for example, by displaying fields (e.g., text fields, drop-down lists, selection boxes, etc.) labelled to request particular information from the user. For example, in one case in which a user accesses structural analysis software platform 210 as part of a claims submission and/or handling process, the user may input an identification of a structure (e.g., a home or other building), a room (e.g., a living room, kitchen, etc.), and/or a particular feature that may have been damaged. In other words, structural analysis software platform 210 may receive project identifier(s), room identifier(s), and/or claim identifier(s). This information may include a claim number, a policy number of an insurance policy associated with the structure and/or the user, a policyholder name or other identifier, a room type, room features (e.g., ceiling type, window type, door type, staircase, building materials, etc.), location of damage, and/or any other data.

Structural analysis software platform 210 may be configured to analyze the captured 3D images. In one exemplary embodiment, structural analysis software platform 210 may be configured to automatically extract a plurality of measurements in the 3D images. For example, if the object pictured in the 3D images is a structure or room, structural analysis software platform 210 may be configured to automatically extract one or more of wall length, wall height, doorway dimension, window dimension, missing wall height, and/or missing wall length.

Structural analysis software platform 210 may be configured to display one or more of the 3D image(s) on a display device 222 of structural analysis computing device 102. Display device 222 may be any component capable of conveying information to the user. In some embodiments, display device 222 may include an output adapter such as a video adapter and/or an audio adapter operatively coupled to processor 202. Display device 222 may include, for example, a liquid crystal display (LCD), organic light emitting diode (OLED) display, cathode ray tube (CRT), or "electronic ink" display and/or an audio output device (e.g., a speaker or headphones). In some embodiments, display device 222 may be configured to present an interactive user interface (e.g., a web browser or client application) to the user. The interactive user interface may include, for example, a user interface for structural analysis software platform 210 and/or claim evaluation software platform 212.

Stored in memory area 220 are, for example, computer-readable instructions for providing a user interface to the user via display device 222 and, optionally, receiving and processing input from input device 224. A user interface may include, among other possibilities, a web browser and client application. Web browsers enable users to display and interact with media and other information typically embedded on a web page or a website from a web server associated with a third party (e.g., an insurance provider). A client application allows users to interact with a server application associated with, for example, a vendor or business. In the example embodiment, the structural analysis software platform may be configured to display (e.g., on display device 222 and/or a user interface thereon) one or more of the automatically extracted measurements on the displayed 3D image(s) for review.

The user may then review the displayed 3D images including the automatically extracted measurements. Structural analysis software platform 210 may facilitate display of the 3D images on display device 222 such that user may manipulate the displayed 3D images. For example, the user may rotate the 3D image, may zoom in, and/or may zoom out to change a displayed view. In some embodiments, the user may determine that additional measurements are needed in order to fully analyze or assess the object. For example, the user may determine that a particular feature of a room, such as a set of cabinetry or a bay of windows, needs repair or replacement. Accordingly, the damaged feature(s) may need to be measured in order to accurately generate an estimated repair or replacement cost (e.g., a claim disbursement amount). Structural analysis software platform 210 may be configured to extract any additional measurements, either automatically or upon request or instruction from the user of structural analysis computing device 102.

Structural analysis software platform 210 may be configured to receive user input from the user from an input device 224 of the structural analysis computing device. Input device 224 may include, for example, a keyboard, a pointing device, a mouse, a stylus, a touch sensitive panel (e.g., a touch pad or a touch screen), a camera, a gyroscope, an accelerometer, a position detector, and/or an audio input device. It should be understood that in some embodiment, a single component such as a touch screen may function as both display device 222 and input device 224. In one exemplary embodiment, structural analysis software platform 210 may accept "point and click" input from the user via input device 224.

Structural analysis software platform 210 may receive a first user input corresponding to a first input location from input device 224 (e.g., corresponding to a first end of the desired additional measurement). This first input location may represent a first physical location, such as the physical location of a first end of the set of cabinets or a first end of the bay of windows. Structural analysis software platform 210 may receive a second user input corresponding to a second input location from input device 224 (e.g., corresponding to a second end of the desired additional measurement). This second input location may represent a second physical location, such as the physical location of a second end of the set of cabinets of a second end of the bay of windows. Structural analysis software platform 210 may then determine a first distance between the first and second input locations, and, accordingly, extract a second distance corresponding to the physical distance between the first and second physical locations. Structural analysis software platform 210 may then display the second distance as an additional measurement on the 3D image on display device 222. In alternative embodiments, structural analysis software platform 210 may accept instructions to extract additional measurements according to any other method, for example, using pixel coordinates or an alternative syntax to input opposing ends of the requested additional measurements.

Structural analysis software platform 210 may extract and/or display any number of additional measurements. Once the user is satisfied that any necessary measurements have been extracted, the user may instruct structural analysis software platform 210 to complete this user input process and export the 3D image and any extracted measurements. For example, the user may select a "Complete and Export" command on a user interface of structural analysis software platform 210. Upon receiving instructions to complete the user input process, structural analysis software platform 210 may be configured to generate a data file including the 3D image(s) and any extracted measurements. In one exemplary embodiment, the generated data file is formatted as an Extensible Markup Language (XML) data file. The data file may include any other data received and/or extracted by structural analysis software platform 210, including any claim, structure, and/or room identifiers, comments, features, objects, building materials, and/or any other data.

Structural analysis software platform 210 may be configured to export the data file. Exporting may include storing the data file in a memory (e.g., memory device 108 and/or memory 220), transmitting the data file to another software platform, and/or transmitting the data file to another computing device. For example, structural analysis software platform 210 may be configured to export the data file to claim evaluation software platform 212 installed on and/or implemented by processor 202. Structural analysis computing device 102 may also include a communication interface 226, which is communicatively coupleable to a remote device such as another structural analysis computing device 102, 104 and/or insurance server 112 (shown in FIG. 1). Communication interface 1125 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Exemplary Use of Mobile Photogrammetry System and Structural Analysis Computing Device The following examples are illustrative of various aspects and embodiments of the disclosure described herein. Accordingly, it should be understood that such examples are for illustration only and do not limit the scope of the present disclosure.

Figure 3:
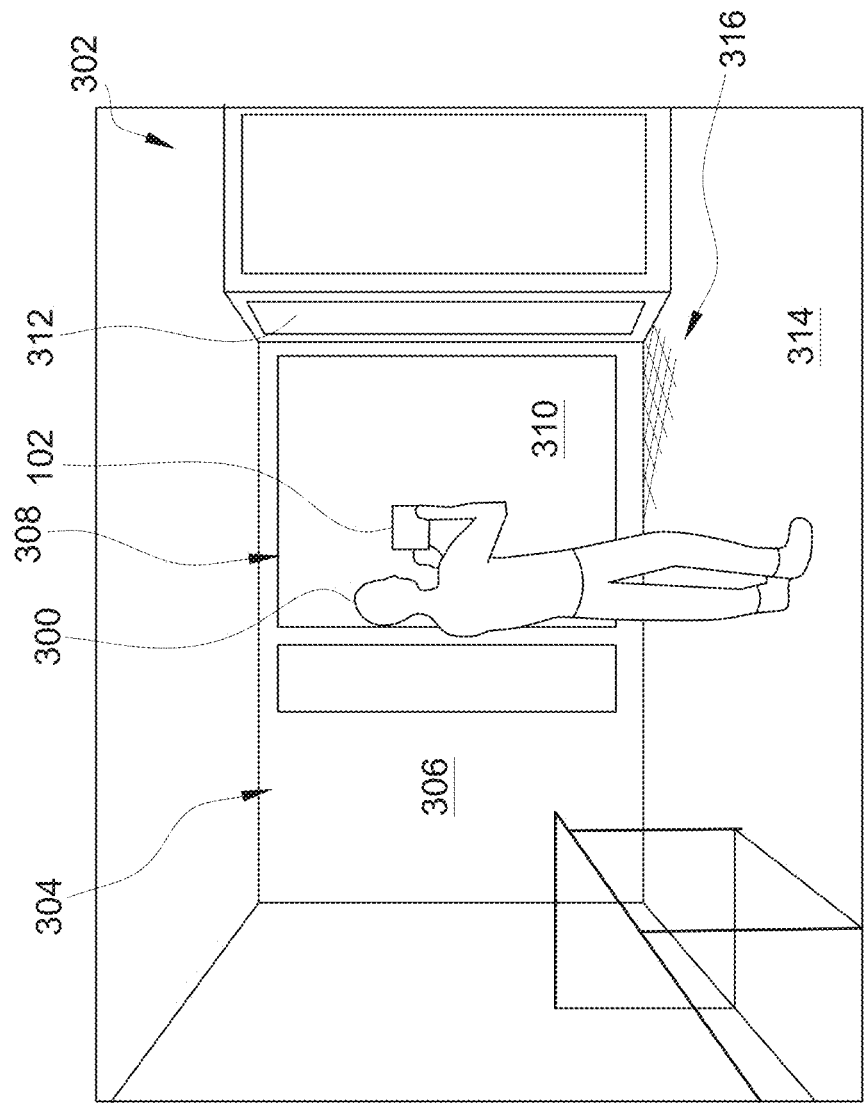
FIG. 3 depicts a first exemplary use of the mobile photogrammetry system shown in FIG. 1 including a user using the structural analysis computing device shown in FIG. 2 to capture three-dimensional (3D) images of a structure for analysis.

FIGS. 3-6 illustrate various aspects of the disclosure using a first example of an object, in this case a structure 302, being analyzed using the mobile photogrammetry system 100 shown in FIG. 1. In particular, FIG. 3 depicts a user 300 using a structural analysis computing device 102 (as shown in FIGS. 1 and 2) to capture three-dimensional (3D) images of structure 302 for analysis. Structure 302 includes a first room 304, which itself includes a plurality of walls 306 and windows 308. In the exemplary embodiment, structural analysis computing device 102 is illustrated as a tablet, however, it should be understood that structural analysis computing device 102 may be any structural analysis computing device configured to function as described herein.

User 300 may capture one or more 3D images of structure 302. In particular, user 300 may capture a plurality of 3D images of room 304, and a plurality of 3D images of any other room(s) of interest in structure 302. For example, user 300 may be a homeowner of structure 302 submitting 3D images for a claim for broken windows 310, 312 and a damaged portion 316 of a floor 314 of room 304, and/or may be a claims handler capturing 3D images for that claim.

Figure 4:
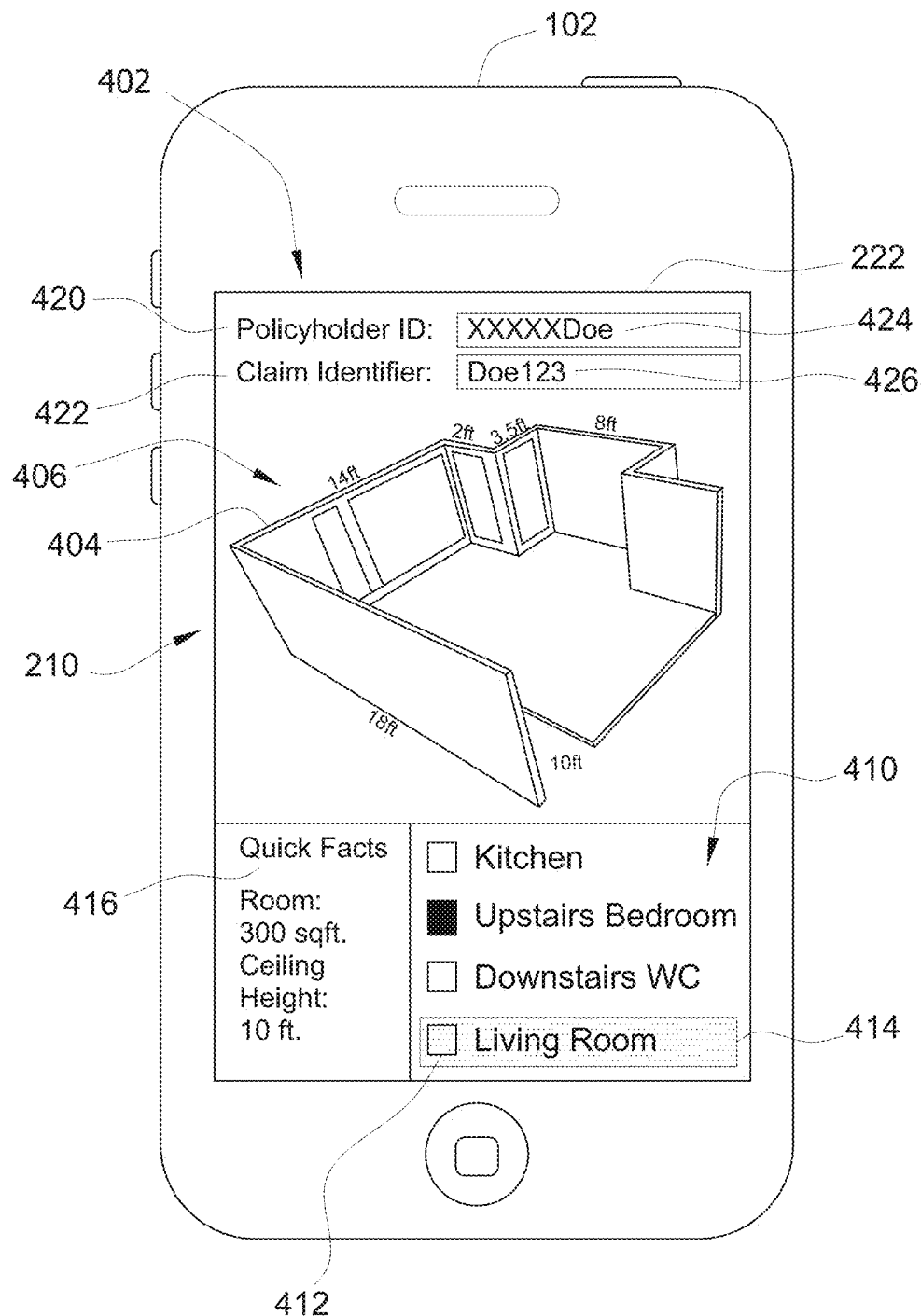
FIG. 4 depicts an exemplary user interface of a structural analysis software platform implemented on the structural analysis computing device shown in FIG. 2.

FIG. 4 depicts an exemplary user interface 402 of structural analysis software platform 210 (shown in FIG. 2) on a display device 222 (also shown in FIG. 2) of structural analysis computing device 102. User interface 402 may depict a 3D model (also referred to herein as 3D image) 404 of room 304. In the exemplary embodiment, 3D model 404 may displayed with one or more automatically extracted measurements 406 of room 304, such as wall length(s) and/or wall height(s). User interface 402 may include additional features, including a menu 410 of rooms of structure 302 that may be viewed thereon. In one embodiment, menu 410 includes status indicators 412 that indicate whether 3D image(s) are available for particular rooms of structure 302. In the illustrated embodiment, status indicators 412 indicate that a kitchen, downstairs water closet, and living room (room 304) may have 3D image(s) available, whereas an upstairs bedroom may not.

Menu 410 may depict a selected room 414, which is room 304 or the living room, in the illustrated embodiment. User interface 402 may also include a "Quick Facts" portion 416 or window configured to display facts about the selected room 414 to user 300 (e.g., square footage, ceiling height, etc.).

Additionally, in the exemplary embodiment, user interface 402 may include a policyholder identification field 420 and a claim identification field 422, such that any information input to, and/or extracted from, structural analysis software platform 210 may be saved for evaluation of a claim on structure 302. Policyholder identification field 420 may be configured to receive a policyholder identifier 424 ("XXXXDoe" in the illustrated embodiment), which may include a policyholder name and/or an alphanumeric identifier associated with the policyholder (e.g., an alphanumeric identifier assigned by an insurance provider that provides an insurance policy associated with structure 302).

Claim identification field 422 may be configured to receive and/or display a claim identifier 426. Claim identifier 426 may be entered by user 300 and may conform to certain naming conventions and/or may be automatically generated by structural analysis software platform 210 based upon the policyholder identifier 424 and/or any other information or naming conventions. Additionally or alternatively, user interface 402 may include other fields, such as a project identification field, a room identification field, and/or a comments field.

In the illustrated embodiment, as described above, displayed 3D model 404 may include measurements 406 that were automatically extracted by structural analysis software platform 210 as implemented on structural analysis computing device 102. However, user 300 may view 3D model 404 and desire additional measurements be extracted and/or displayed. Continuing the above example, user 300 may wish to have measurements of broken windows 310, 312 extracted and displayed. Additionally or alternatively, user 300 may wish to have measurements of damaged portion 316 of floor 314 be extracted and displayed.

Figure 5:
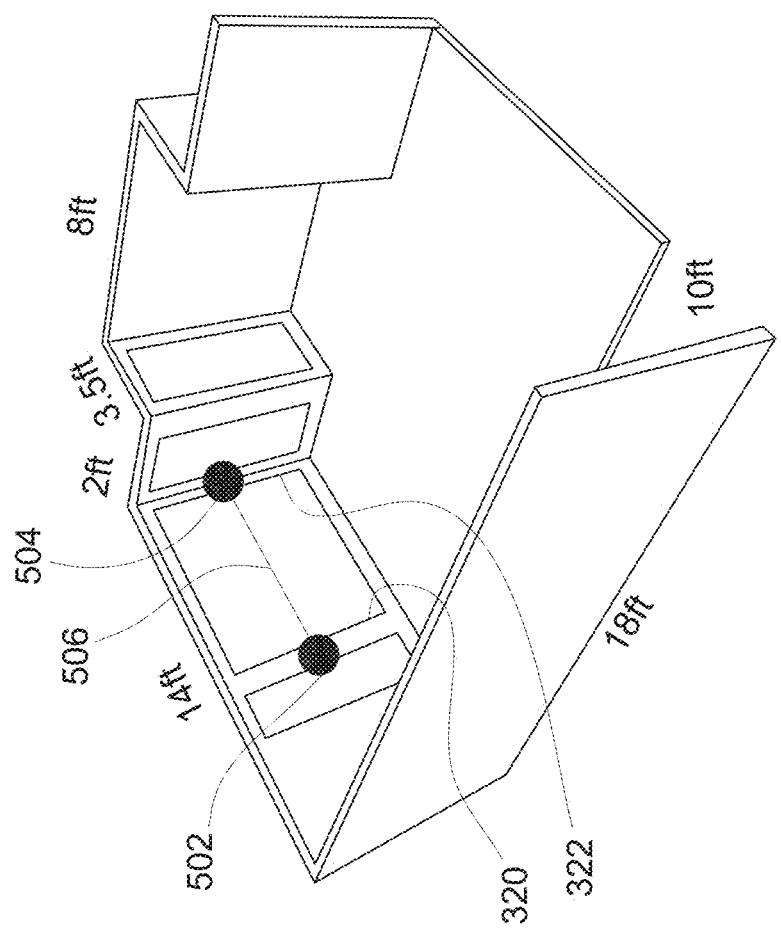
FIG. 5 depicts an exemplary embodiment of the structural analysis software platform implemented on the structural analysis computing device shown in FIG. 2 extracting additional measurements.

FIG. 5 depicts one exemplary embodiment of structural analysis software platform 210 (shown in FIG. 2) extracting additional measurements. More specifically, structural analysis software platform 210 may receive input and instructions from user 300 to extract a width measurement of broken window 310 for a claim thereon. User 300 may select (e.g., taps, clicks, etc.) a first input location 502 on 3D image 404 of room 304 using input device 224 (shown in FIG. 2, e.g., touch screen, mouse, keyboard, etc.) of structural analysis computing device 102. In the illustrated embodiment, first input location 502 may represent a first physical location of a first edge or side 320 of broken window 310. Structural analysis software platform 210 may receive an indication of first input location 502 from input device 224. User 300 may select a second input location 504 on 3D image 404 of room 304 using input device 224. Second input location 504 may represent a second physical location of a second edge or side 322 of broken window 310. Structural analysis software platform 210 may receive an indication of second input location 504 from input device 224.

Structural analysis software platform 210 may calculate a first distance 506 between first input location 502 and second input location 504, relative to display device 222 and/or user interface 402. Structural analysis software platform 210 may use first distance 506 and extracted measurement(s) 306 (and/or additional 3D photogrammetry techniques, algorithms, and/or functionality) to calculate a second distance (not shown) between the first physical location, or first edge 320 of broken window 310, and the second physical location, or second edge 322 of broken window 310. Accordingly, the second distance may be displayed on 3D image 404 as the requested additional measurement of the width of broken window 310.

This "point and click" process may implemented any number of times for user 300 to request additional measurements from structural analysis software platform 210, until all measurements necessary for processing the claim are extracted. In alternative embodiments, additional measurements may be requested using alternative methods, including inputting coordinates of first and second input locations 502, 504, using another input syntax to represent first and second input locations 502, 504 (e.g., voice commands), and/or any other methods. Alternatively or additionally, structural analysis software platform 210 may automatically extract additional measurements using machine learning functionality (e.g., neural networks, decision trees, logic programming, etc.). For example, structural analysis software platform 210 may be configured to recognize windows in a structure and may be configured to learn that measurements of windows (e.g., width and height) are frequently requested by user 300. Structural analysis software platform 210 may then automatically extract window measurements from 3D images 404.

As another example, structural analysis software platform 210 may be configured to recognize keywords in a claim identifier, such as "window," "break-in", "fire", etc. and may be configured to associate particular additional measurements that are frequently requested for claims including those keywords. Structural analysis software platform 210 may then automatically extract additional measurements according to recognized keywords.

Additionally, in some embodiments, structural analysis software platform 210 may be configured to analyze 3D image 402 to determine additional data associated with structure 302. For example, structural analysis software platform 210 may determine building materials and/or status of various features of structure 302, such as a flooring material; whether a window is double- or single-paned; whether a feature needs repair, replacement, and/or cleaning; how much of a feature is damaged; etc.

Figure 6:
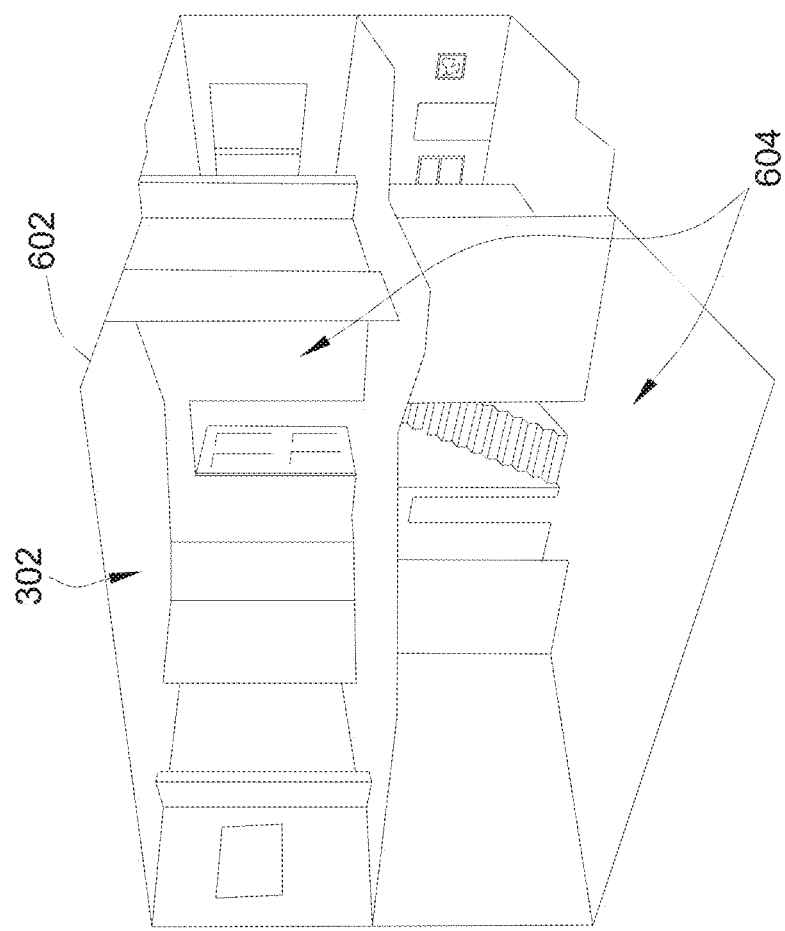
FIG. 6 depicts a 3D model of the structure being analyzed using the mobile photogrammetry system shown in FIG. 1.

FIG. 6 depicts an exemplary 3D model (also referred to herein as a "3D image") 602 of structure 302 (shown in FIG. 3). 3D model 602 may be displayed to user 300 on user interface 402 such that user 300 may navigate between various rooms 604 of structure 302 to view 3D images thereof. For example, if user 300 is generating and/or submitting a claim involving more than one room, user 300 may select rooms 604 of interest on 3D model 602 to navigate therebetween (i.e., switch views therebetween). Structural analysis software platform 210 may be configured to generate 3D model 602 based upon a plurality of 3D images captured of rooms 604 therein.

Structural analysis software platform 210 may be configured to save and/or export a data file including any extracted, received, and/or calculated information, such as 3D models 402 and/or 602, extracted measurements 406, additional measurements, policyholder identifier 424, claim identifier 426, and/or any other information. In one exemplary embodiment, structural analysis software platform 210 may be configured to export the data file to claims evaluation software platform 212 (shown in FIG. 2) to evaluate the information therein and determine a claim disbursement amount associated therewith.

Figure 7:
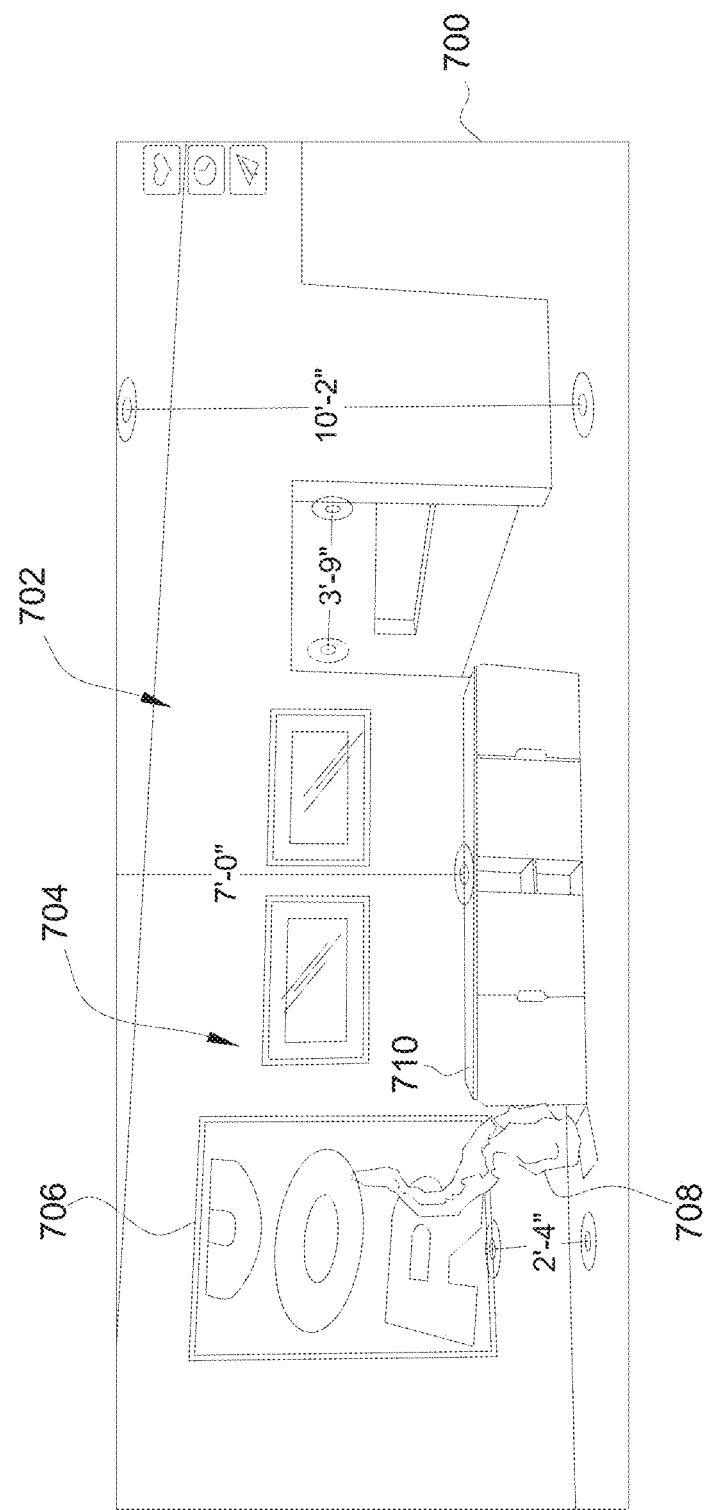
FIG. 7 depicts a second exemplary use of the mobile photogrammetry system shown in FIG. 1 including a first 3D image of a room.
Figure 8:
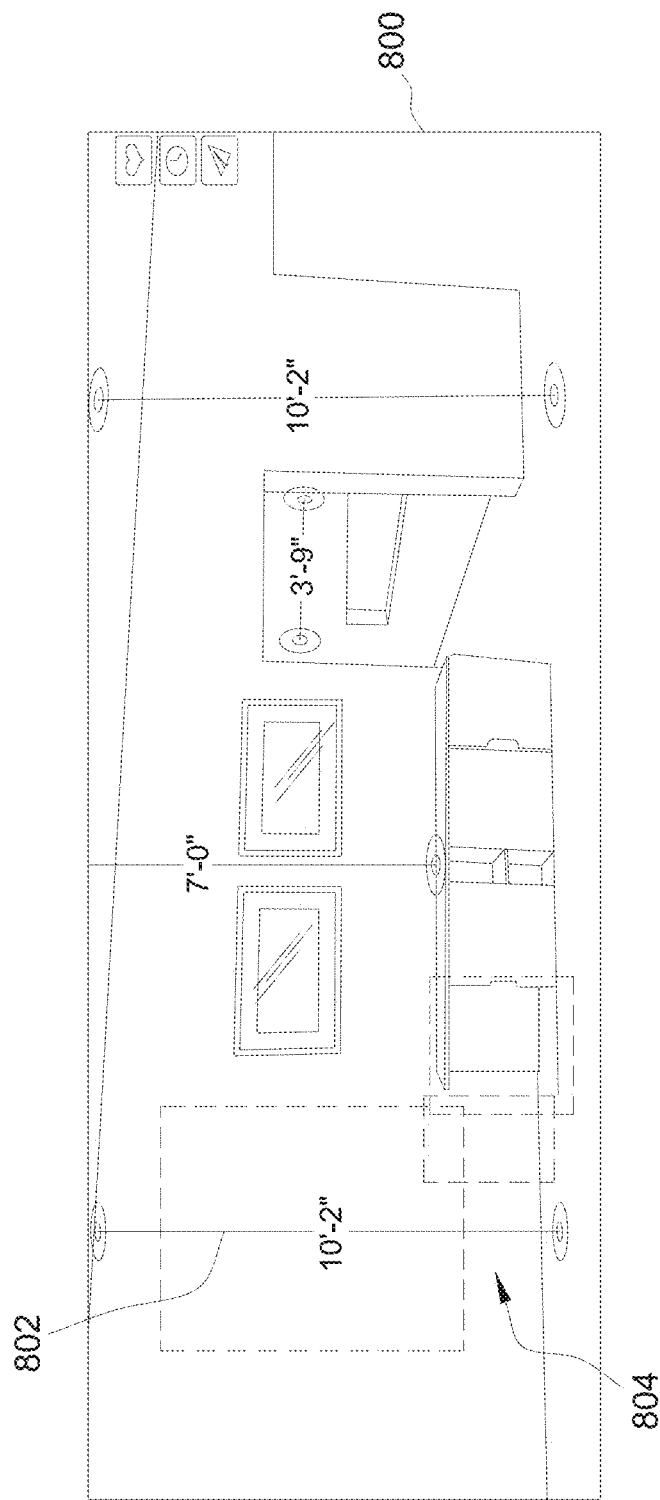
FIG. 8 depicts a second 3D image of the room shown in FIG. 7.

FIGS. 7 and 8 illustrate a second exemplary use of mobile photogrammetry system 100 (shown in FIG. 1). More specifically, FIGS. 7 and 8 illustrate using mobile photogrammetry system 100 for object inventory, for example, in a "before-and-after" break-in scenario. FIG. 7 depicts a first 3D image 700 (e.g., a "before" 3D image 700) of a room 702. Room 702 may have various contents 704 therein that may be of particular monetary and/or sentimental value to a user (e.g., user 300 as shown in FIG. 3, not shown in FIGS. 7 and 8). In the illustrated embodiment, contents 704 include a painting 706, a sculpture 708, and a cabinet 710. Accordingly, user 300 may capture first 3D image 700 using a structural analysis computing device (e.g., structural analysis computing device 102 as shown in FIGS. 1-4, not shown in FIGS. 7 and 8) to show a location of contents 704 and to create an inventory of contents 704. User 300 may use first 3D image 700 to purchase an insurance policy on contents 704 with an insurance provider.

FIG. 8 depicts a second 3D image 800 (e.g., an "after" image 800) of room 702 after, for example, a break-in and theft. Second 3D image 800 depicts contents 704 and shows that painting 706 and sculpture 708 are missing and that cabinet 710 has been damaged (e.g., is missing a door). User 300 may capture second 3D image 800 using structural analysis computing device 102 to show a state of room 702 after the theft in order to identify what is missing and/or damaged to the insurance provider in a claim.

User 300 may use structural analysis computing device 102 to submit captured first and second 3D images 700 and 800 to structural analysis software platform 210 (shown in FIG. 2). Structural analysis software platform 210 may be configured to automatically extract measurements 802 from first and/or second 3D images 700 and 800. In some embodiments, structural analysis software platform 210 may use extracted measurements 802 to identify differences 804 between first and second 3D images 700 and 800. Additionally or alternatively, structural analysis software platform 210 may be configured to use other 3D image analysis to automatically identify differences 804 between first and second 3D images 700 and 800, such as color comparison. Structural analysis software platform 210 may be configured to save and/or export identified differences 804, first and/or second 3D image(s) 700 and/or 800, and/or any other extracted, received, and/or calculated information in a data file, for example, for use by claims evaluation software platform 212 (shown in FIG. 2).

Figure 9:
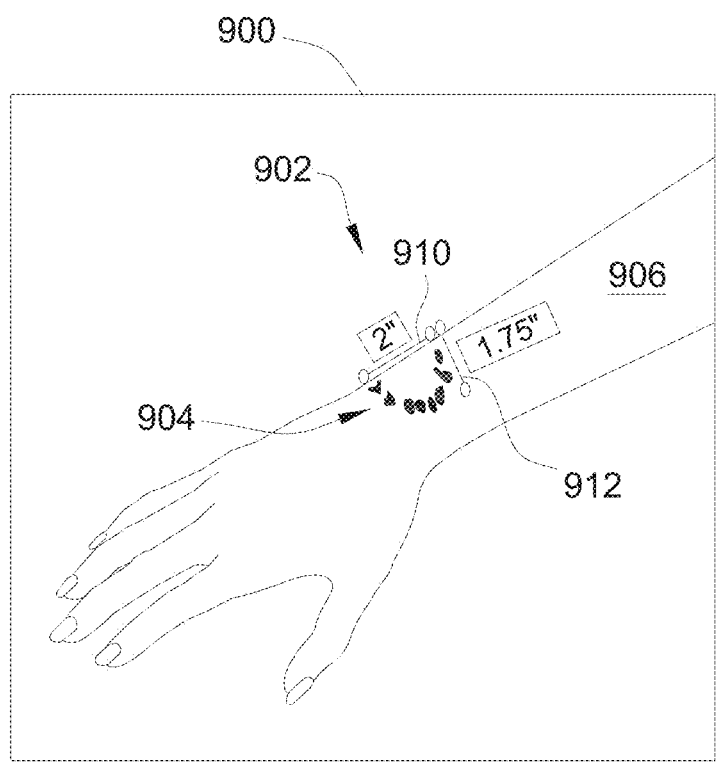
FIG. 9 illustrates a third exemplary use of the mobile photogrammetry system shown in FIG. 1.

FIG. 9 illustrates a third exemplary use of mobile photogrammetry system 100 (shown in FIG. 1). More specifically, FIG. 9 depicts an exemplary 3D image 900 of a damaged feature 902 of a person (not specifically shown) for analysis using mobile photogrammetry system 100. A user (e.g., user 300 as shown in FIG. 3) may capture 3D image 900 using a structural analysis computing device (e.g., structural analysis computing device 102 as shown in FIGS. 1-4). 3D image 900 may include one or more views of damaged feature 902, in this example a dog bite 904 on a forearm 906.

User 300 may submit capture 3D image 900 to structural analysis software platform 210 (shown in FIG. 2). Structural analysis software platform 210 may be configured to automatically extract measurements 910, 912 of damaged feature 902. Structural analysis software platform 210 may be further configured to receive instructions from user 300 to extract additional measurements of damaged feature 902, as described above (e.g., a depth of dog bite 904, measurement(s) of individual teeth marks or bruising therearound, etc.). Structural analysis software platform 210 may be configured to save and/or export extracted measurements 910, 912, 3D image 700, and/or any other extracted, received, and/or calculated information in a data file, for example, for use by claims evaluation software platform 212 (shown in FIG. 2).

FIG. 10 illustrates an exemplary data file 1000 used in mobile photogrammetry system 100 (shown in FIG. 1). Data file 1000 may have an XML format and/or any other suitable file format for storage and/or export between various applications or software platforms (e.g., structural analysis software platform 210 and/or claim evaluation software platform 212, shown in FIG. 2). Data file 1000 may be saved in a memory device, such as memory device 108 (shown in FIG. 1) and/or memory 220 (shown in FIG. 2). Data file 1000 may include additional, fewer, and/or different fields than as shown in the illustrated embodiment. For example, data file 1000 may include one or more 3D image(s).

In the exemplary embodiment, at least some of data file 1000 may be generated, received, saved, and/or exported by structural analysis software platform 210. For example, the claim identifier (e.g., claim identifier 426, shown in FIG. 4), an object identifier such as a room name, feature, room type, ceiling type, window type, window subtype, measurement(s), material, and/or status may be exported by structural analysis software platform 210 as data file 1000.

At least some of data file 1000 may be generated, saved, and/or exported by claim evaluation software platform 212. For example, claim evaluation software platform 212 may receive at least some of data file 1000 from structural analysis software platform 210 and/or may retrieve the at least some of data file 1000 memory 108. Claim evaluation software platform 212 may be configured to analyze the data contained therein as it corresponds to an insurance claim associated therewith, as identified by the claim identifier. Claim evaluation software platform 212 may be configured to determine whether data file 1000 (as received) is associated with an existing project and/or claim (e.g., using the claim identifier and/or other data, such as a project identifier or policyholder identifier).

If data file 1000 (as received) is not associated with an existing project and/or claim, claim evaluation software platform 212 may be configured to generate a new project and/or claim and import data from data file 1000 into the new project and/or claim. If data file 1000 (as received) is associated with an existing project and/or claim, claim evaluation software platform 212 may be configured to import data from data file 1000 that is not present in the existing project and/or claim, and/or that is different from existing data in the project and/or claim.

Claim evaluation software platform 212 may be further configured to evaluate the project and/or claim based upon data file 1000 and may append data file 1000 to include the results of that evaluation. For example, in the illustrated embodiment, claim evaluation software platform 212 may be configured to determine one or more of material, status, and/or estimate(s), based upon data file 1000 (as received), including any 3D images therein. Claim evaluation software platform 212 may retrieve reference and/or historical information from memory device 108 in order to evaluate data file 1000. For example, claim evaluation software platform 212 may use images, values, past claims, indices, keywords, and/or any other stored information to determine a material of an feature, a status of a feature, a determined action to be taken (e.g., cleaning vs. repair), and/or an estimate for that determined action. In some embodiments, claim evaluation software platform 212 may further employ machine learning functionality to make any of the above determinations.

Claim evaluation software platform 212 may be configured to generate an estimate for any repairs, replacements, cleaning, abatement, etc. identified in data file 1000. In other words, claim evaluation software platform 212 may generate a claim disbursement amount 1002. In the illustrated embodiment, claim disbursement amount 1002 may be a total of the estimates in data file 1000 (e.g., $200+$900+$300=$1,400). Claim evaluation software platform 1000 may append and/or edit data file 1000 to include any determined values and/or fields associated therewith.

Additionally or alternatively, at least some of data file 1000 may be input by a user (e.g., user 300, shown in FIG. 3). For example, user 300 may make certain determinations, such as whether a feature should be cleaned or repaired, and may enter such determinations into corresponding fields to be included in data file 1000.

In some embodiments, structural analysis computing device 102 (shown in FIGS. 1-4) may be configured to transmit data file 1000 to another computing device, such as insurance server 112 (shown in FIG. 1) and/or memory device 108. For example, structural analysis computing device 102 may transmit data file 1000 including claim disbursement amount 1002 to insurance server 112 for disbursement of the corresponding amount to a policyholder. As another example, structural analysis computing device 102 may transmit data file 1000 without a claim disbursement amount to insurance server 112, and insurance server 112 may use data file 1000 to determine a claim disbursement amount. In some embodiments, insurance server 112 may be configured to implement claim evaluation platform 212 to retrieve data file 1000 and/or determine a claim disbursement amount.

Additionally or alternatively, in some embodiments, structural analysis computing device 102 may transmit data file 1000 including claims disbursement amount 1002 in a claim generation or claim submission signal to insurance server 112. The claim generation signal may be configured to activate insurance server 112 and to cause insurance server 112 to automatically generate and/or populate a claims form with information from data file 1000.

Exemplary Server Computing Device

Figure 11:
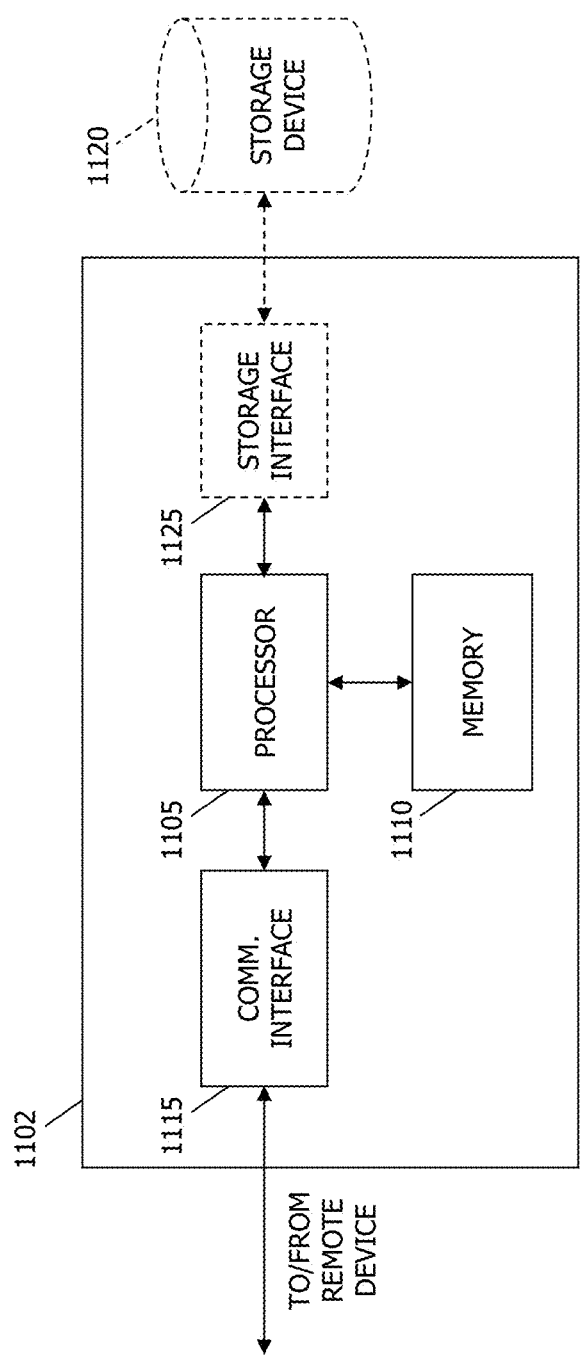
FIG. 11 depicts an exemplary configuration of a server computing device that may be used in the mobile photogrammetry system shown in FIG. 1.

FIG. 11 depicts an exemplary configuration of a server computing device 1102. Server computing device 1102 may be representative of database server 106, and/or insurance server 112 (both shown in FIG. 1). Server computing device 1102 may include a processor 1105 for executing instructions. Instructions may be stored in a memory area 1110, for example. Processor 1105 may include one or more processing units (e.g., in a multi-core configuration).

Processor 1105 may be operatively coupled to a communication interface 1115 such that server computing device 1102 may be capable of communicating with a remote device, such as structural analysis computing device 102 or another server computing device 1102. For example, communication interface 1115 may receive requests from structural analysis computing device 102 via the Internet.

Processor 1105 may also be operatively coupled to a storage device 1120. Storage device 1120 may be any computer-operated hardware suitable for storing and/or retrieving data. In some embodiments, storage device 1120 may be integrated in server computing device 1102. For example, server computing device 1102 may include one or more hard disk drives as storage device 1120. In other embodiments, storage device 1120 may be external to server computing device 1102 and may be accessed by a plurality of server computing devices 1102. For example, storage device 1120 may include multiple storage units, such as hard disks or solid state disks in a redundant array of inexpensive disks (RAID) configuration. Storage device 1120 may include a storage area network (SAN) and/or a network attached storage (NAS) system.

In some embodiments, processor 1105 may be operatively coupled to storage device 1120 via a storage interface 1125. Storage interface 1125 may be any component capable of providing processor 1105 with access to storage device

1120. Storage interface 1125 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1120.

Memories 108 (shown in FIG. 1), 220 (shown in FIG. 2), and/or 1110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 12:
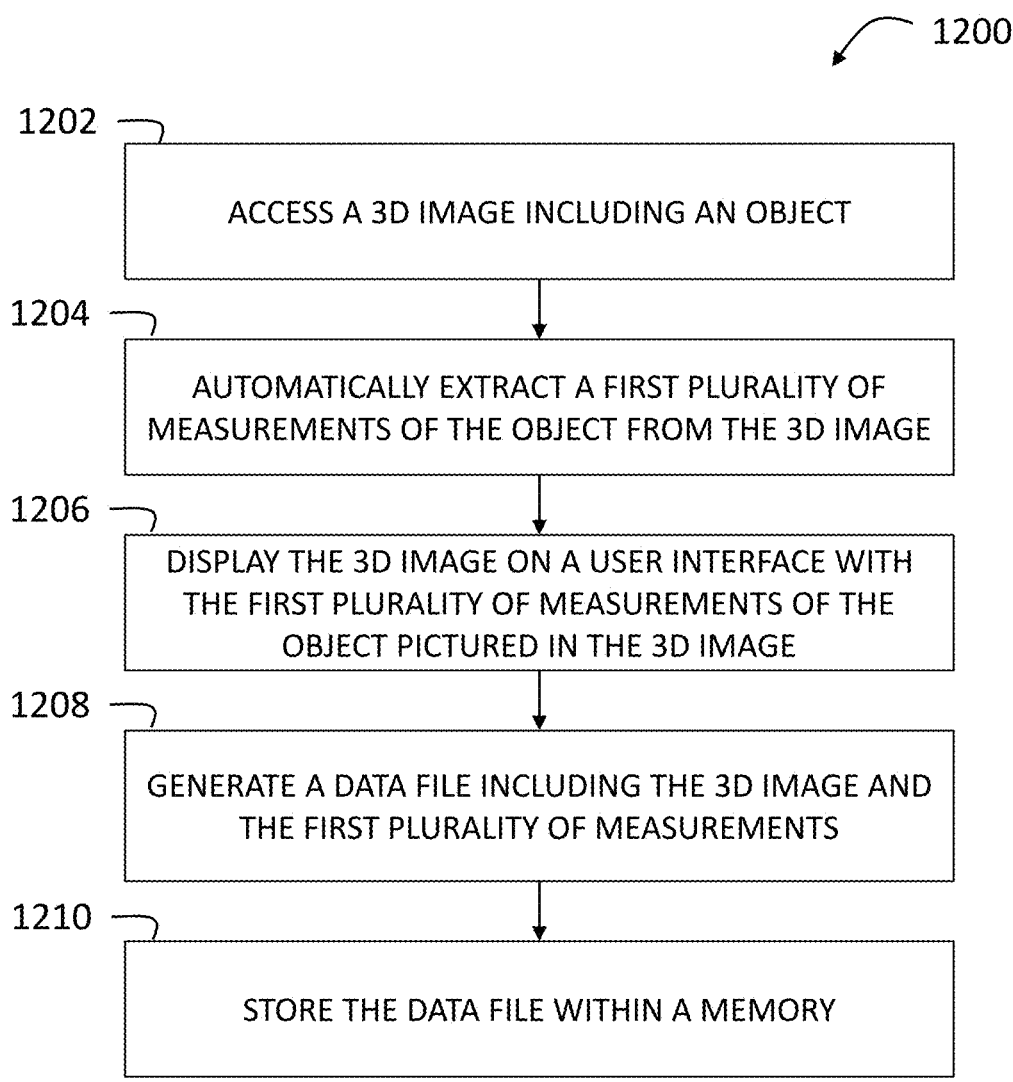
FIG. 12 illustrates a flowchart of an exemplary computer-implemented method for extracting structural characteristics of a structure using the mobile photogrammetry system shown in FIG. 1.

Exemplary Computer-Implemented Method of Extracting Structural Characteristics from 3D Images FIG. 12 illustrates a flowchart of an exemplary computer-implemented method 1200 for extracting structural characteristics of a structure using mobile photogrammetry system 100 (shown in FIG. 1). More particularly, at least some steps of method 1200 may be implemented using structural analysis computing device 102 (also shown in FIG. 1), for example, using at least one of structural analysis software platform 210 and claim evaluation platform 212 (both shown in FIG. 2). Method 1200 may include accessing 1202 a 3D image (e.g., 3D image 404, shown in FIG. 4) including an object (e.g., structure 302 and/or room 304, shown in FIG. 3). As described herein, the 3D image may be captured using an object sensor (e.g., object sensor 110, shown in FIGS. 1 and 2) included in structural analysis computing device 102.

Method 1200 may further include automatically extracting 1204 a first plurality of measurements of the object from the 3D image, and displaying 1206 the 3D image on a user interface (e.g., user interface 402) with the first plurality of measurements of the object pictured in the 3D image. Method 1200 may also include generating 1208 a data file (e.g., data file 1000, shown in FIG. 10) including the 3D image and the first plurality of measurements, and storing 1210 the data file within a memory (e.g., memory device 108, shown in FIG. 1). Method 1200 may include additional, less, or alternate actions, including those discussed elsewhere herein.

Exemplary Structural Analysis Computing Device

Figure 13:
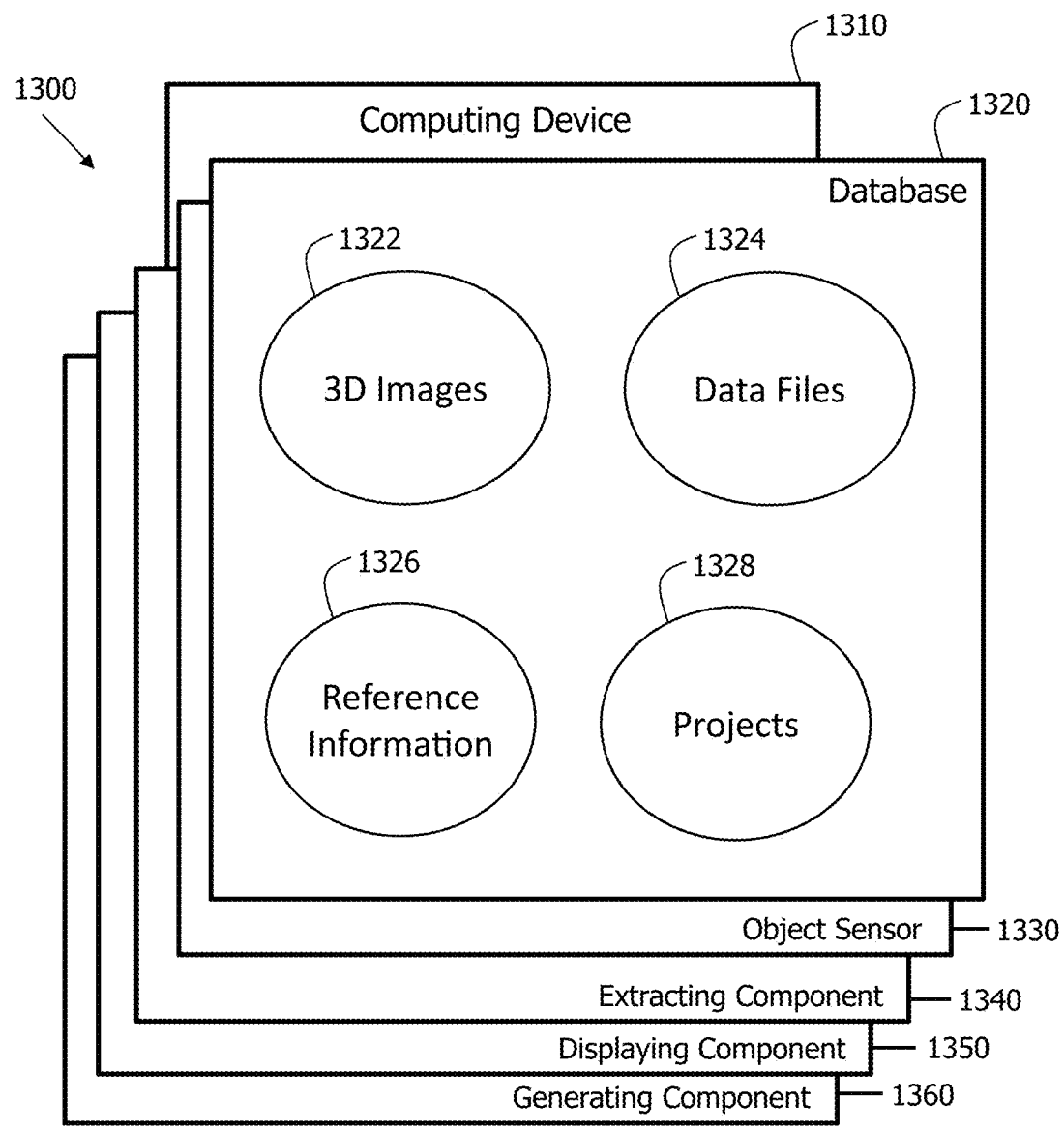
FIG. 13 depicts a diagram of components of one or more exemplary computing devices that may be used in the mobile photogrammetry system shown in FIG. 1.

FIG. 13 depicts a diagram 1300 of components of one or more exemplary structural analysis computing devices 1310 that may be used in mobile photogrammetry system 100 (shown in FIG. 1). Structural analysis computing device 1310 may be similar to structural analysis computing device 102 and/or structural analysis computing device 104 (both shown in FIG. 1). FIG. 12 further shows a configuration of data in database 1320, which may be similar to memory device 108 (also shown in FIG. 1). Database 1320 may include, for example, 3D images 1322, data files 1324, reference information 1326, projects 1328 (e.g., project, object, and/or claim identifiers) and other data as described elsewhere herein. Database 1320 may be in communication with several separate components within structural analysis computing device 1310, which perform specific tasks.

More specifically, structural analysis computing device 1310 may include an object sensor 1330 configured to capture 3D images 1322 of an object and to make 3D images accessible to other components of structural analysis computing device 1310. Structural analysis computing device 1310 may also include an extracting component 1340 configured to automatically determine or extract a first plurality of measurements of the object from 3D image 1322. Structural analysis computing device 1310 may further include a displaying component 1350 (e.g., display device 222, shown in FIG. 2) configured to display 3D image 1322 on a user interface (e.g., user interface 402, shown in FIG. 4) with the first plurality of measurements of the object pictured in 3D image 1322. Structural analysis computing device 1310 may additionally include a generating component 1360 configured to generate a data file 1324 including 3D image 1322 and the first plurality of measurements.

Exemplary Functionality

The present embodiments relate to 3D scanning, which may also be referred to 3D light scanning, 3D laser scanning, and/or structured-light 3D scanning. The 3D scanners discussed herein may also include any device that measures the physical world using lasers, lights, or x-rays, and generates dense point clouds or polygon meshes. The 3D scanners may also include 3D digitizers, lasers scanners, white light scanners, CT, LIDAR, etc. and other devices that capture the geometry of physical objects (such as rooms, homes, vehicles, personal belongings, people, pets, etc.) with numerous measurements. For instance, the devices may emit light beams out which are reflected off of objects, and the devices may then capture the bounce back of the light beams emitted.

In a preferred embodiment, a 3D scanner for obtaining interior structural room measurements may include a structure sensor from Occipital, Inc. that is configured with a tablet, such as an iPad Air 2. Alternatively, a Google Project Tango 3D sensing-enabled smart phone or tablet may be used. Numerous other 3D scanners may be utilized, including those with integrated depth sensing.

The present embodiments provide a mobile 3D sensing smart device application that will automate and complete photo-documentation, measurement and room data entry steps associated with insurance underwriting, quoting, or claim handling, such as with homeowner's or renters insurance. A software feature or application may create a virtual room or virtual home, with accurate dimensional information. Room measurements may be estimated that include wall lengths, wall heights, missing wall dimensions, door and window opening dimensions, cabinetry lengths, countertop dimensions, fireplace dimensions, etc. All lengths may be embedded within, associated with, or highlighted upon, a virtual depiction of a room or home.

The software application may upload or download digital images of damage to rooms or the home taken by, and/or transmitted by, an insured's mobile 3D sensing smart device. The photos may be uploaded to an insurance claim system. An extent of damage to the interior (and/or exterior) of a room and/or a home (or other structure) may be estimated, as well as a replacement or repair cost may be estimated based upon computer analysis of the images acquired.

The software application may analyze pre-insurance event and/or post-insurance event 3D data and/or 3D digital image data. For instance, from 3D data acquired from the 3D scanner, the software application may (i) determine room types; (ii) name the rooms according to type of room; (iii) determine room sizes; (iv) determine types of ceilings, windows, flooring, doors, and/or doorways; and/or (v) determine staircase measurements to facilitate repairing interior damage after an insurance related-event (such as an event leading to fire, smoke, or water damage to all or part of a home).

In one embodiment, a computer-implemented method using 3D data to estimate damage and/or estimate repairs may be provided. The method may include (1) determining that a room within a structure requires photographic documentation, scope measurement dimensions, and/or an estimate for damage repairs. The method may include (2) accessing mobile 3D Photogrammetry, such as an insurance claim handler or insured accessing a 3D scanning application on his or her mobile device.

The method may also include (3) inputting or retrieving a claim number or insurance policy number, an insured's named, and/or a room name selected from a drop down menu (such as alcove, aisle, attic, ballroom, basement, bedroom, bonus room, breezeway, closet, den, dining room, entryway, exercise room, furnace room, garage, great room, hall, home cinema, kitchen, laundry room, living room, lobby, loft, nursery, office, pantry, recreation room, studio, sunroom, utility room, wine cellar, or workshop). The method may include inputting or determining a room type (e.g., box, L-shape, T-shape, or U-Shape), a ceiling type (e.g., float sloped, peaked, or tray), window type (e.g., bay, box, bow, picture, hung, casement), window subtype (e.g., circle, flat arch, octagon, round, round arch, trapezoid, triangle), doorway type (e.g., standard, bifold, sliding, dutch, pocket, overhead, gate), doorway subtype (e.g., flush, French, half louvered, paneled), and/or staircase type (e.g., regular, regular with landing, L-shaped, etc.). In some embodiments, the foregoing information may be entered by a user taking the 3D scans. In other embodiments, the foregoing information may be determined from analysis of the 3D data acquired and/or 2D digital image data of the room/home.

The method may also include (4) scanning the room using the mobile 3D Photogrammetry application running on a 3D sensing smart phone or tablet (e.g., an iPad with an Occipital Structure Sensor or Project Tango 3D sensor-enabled smart phone or tablet). After which, the method may include (5) the mobile 3D Photogrammetry application or an Estimation application providing a 3D rendering of the room. The application may provide a 3D image of the room with all wall dimensions depicted.

The method may further include (6) reviewing the 3D image of the room. For instance, an insured or claim handler may review the 3D room image and determine what other required room measurements are required. For instance, as shown in FIGS. 4 and 5, a user may view a 3D room rendering including all wall measurements on a smart phone or other mobile device. A floorplan view of rooms may also be generated and displayed.

The method may further include (7) completing any additional room measurements. For instance, an insured or insurance provider representative may navigate within the 3D room image and "point and click" on required measurement items not automatically self-populated based upon pre-designated app requirements (e.g., lineal footage of the base cabinetry in a kitchen). The "point and click" functionality may be provided to complete any additional measurements and/or annotations within the 3D image required.

The method may also include (8) the insured or insurance provider representative (such as an insurance agent or claim handler) clicking upon a "Complete and Export" icon. For instance, once the 3D room image provides all the room data desired, the user may click a "complete and export" icon on the application user interface.

The method may also include (9) employing a 3D Photogrammetry or an Estimation Application that creates an XML data file. For instance, the application may take room data and room measurements supplied in the 3D image of the room and creates a XML data file that may be consumed by an insurance provider remote server and/or estimating platform software. The room data and room measurements may be initially input by the user acquiring the 3D data, or may instead be determined from computer analysis of (i) the 3D data acquired and/or (ii) other digital image data acquired by a mobile device (e.g., smart phone or tablet).

The method may further include (10) exporting claim and/or room data to an insurance provider estimation platform software. For example, the 3D image of the room and room data supplied in the XML data file may be exported to an estimatics platform software. After which, the method may include (11) the estimatics software system generating a new project or additional room on a pre-existing project with the room data.

Upon receipt of data, the estimatics software may first review the claim number and policyholder name. If no such project yet exists with that claim identification data, the estimatics software automatically system-generates the creation of a new project. Upon creation of a new project, the estimatics software reviews, validates and autopopulates (where possible) the room data provided in the XML data file. On the other hand, if a project exists but is for room data not yet part of the project, the estimatics software reviews, validates and auto-populates (where possible) the new room data provided in the XML data file.

The method may include storing all estimates and projects (including 3D images and measurement annotations) on a remote server or in the Cloud. For instance, upon system-generation of the "new project" or "additional room" on a pre-existing project, the estimatics software will send this data (3D imagery with measurements and annotations and corresponding XML data files) to an estimatics vendor "Cloud" service for storage and future usage/reference.

As a result of the above, the solution will generate a virtual illustration of the room; secure the needed measurements; record and save the required measurements of the room on the virtual depiction of the room; create a new project or update an additional room within that virtual project; receive inputted or selected room data (room name or type, ceiling or window type, door or doorway type, staircase type, and measurements) or determine such room data and measurements from the 3D scanner data acquired.

Moreover, the present embodiments may provide exceptional room photo-documentation. Unlike 2D images, these 3D images may allow the user (e.g., insured or insurance provider representative) to navigate will allow the claim handler to navigate within the image and confirm room construction elements (flooring material/wall texture/type of lighting/etc.).

The mobile smart device 3D Photogrammetry application may (i) prompt/accept initial claim identification information; (ii) prompt/accept room data (room name/room type/ceiling type/window type/window subtype/doorway type/doorway subtype/staircase); (iii) scan and display the interior structure of a room as a 3D image that may be navigated within; (iv) auto-populate all of the room's interior structural wall measurements in the 3D image (including: wall lengths, wall heights, missing wall lengths, and/or missing wall heights); (v) provide "point and click" ability to measure the following: cabinetry lengths; cabinetry heights; countertop dimensions; door opening dimensions; window opening dimensions; and/or built-in appliance dimensions; (vi) provide ability to record/save measurements and other annotations (such as room comments) within the 3D room image; (vii) provide ability to create an XML data file from the room data provided by the user and from within the 3D room image; and/or (viii) provide ability to export 3D room image(s) and XML data file(s) to an insurance provider estimatics platform software.

The estimatics software may be coded to accept 3D image(s) and their corresponding XML data file(s). Upon receipt of data, the estimatics software may first review the claim identification data and, if no such project yet exists with that claim identification data, the estimatics software may automatically system-generate the creation of a new project. Upon creation of a new project, the estimatics software may review, validate and autopopulate the room data provided in the XML data file. If a project exists but is for room data not yet part of the project, the estimatics software reviews, may validate and auto-populate the new room data provided in the XML data file. The estimatics software may send to the estimatics data to the "Cloud" for storage, and/or may be coded to allow users Cloud access for project retrieval and subsequent review of project's room 3D imagery (including measurements).

Exemplary Computer-Implemented Methods Using 3D Data

Figure 14:
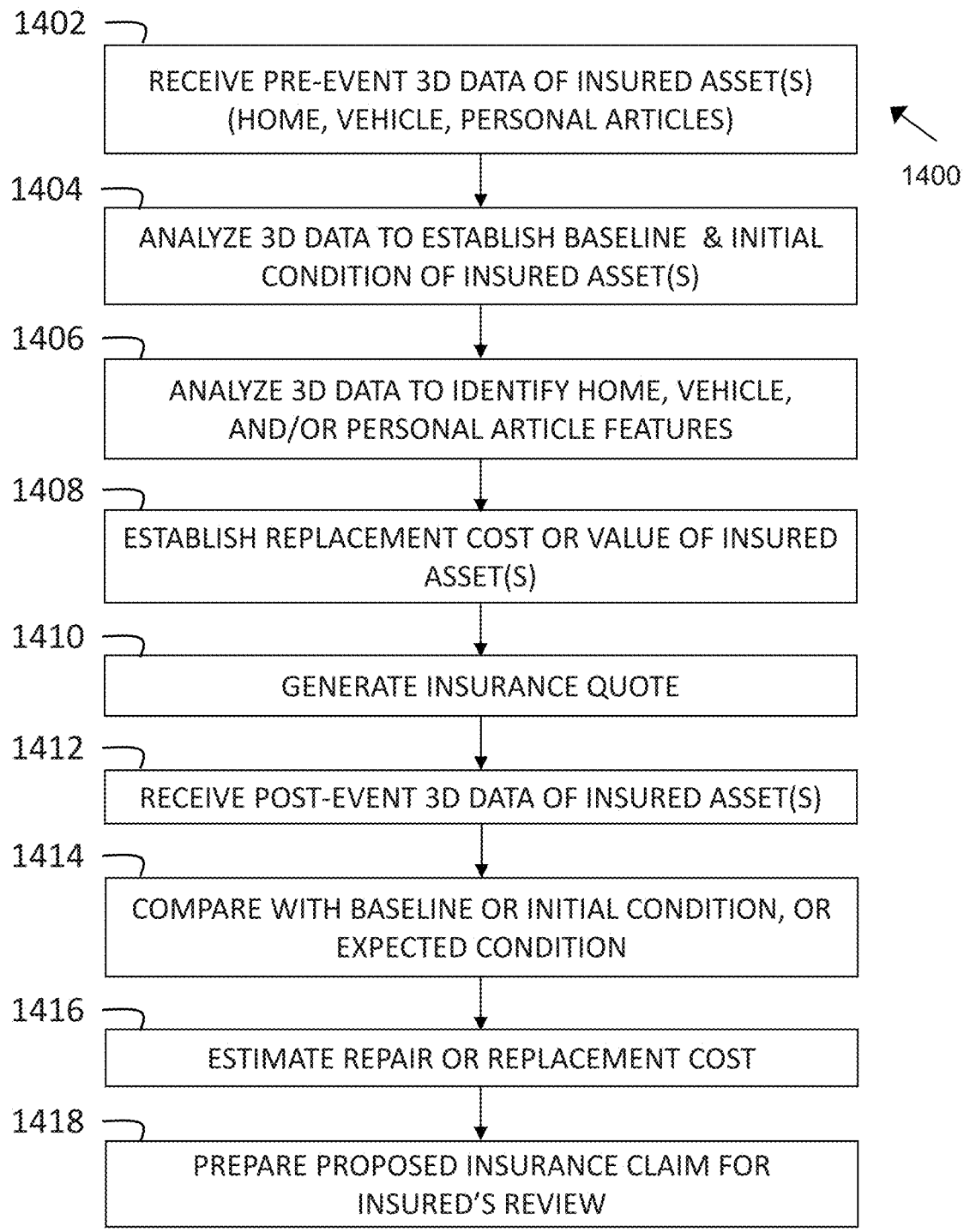
FIG. 14 depicts an exemplary computer-implemented method of estimating repair and/or replacement costs for insured assets using 3D data.

FIG. 14 depicts an exemplary computer-implemented method of estimating repair and/or replacement costs for insured assets using 3D data 1400. The method 1400 may include receiving 1402 pre-insurance event 3D data of one or more insured assets at a remote server, the 3D data being generated and transmitted by a mobile device of customer/insured equipped with 3D scanning functionality. The insured assets may include a home, vehicle, boat, and/or personal articles (including antiques, paintings, furniture, electronics, etc.).

The method 1400 may include analyzing 1404 the 3D data (at the remote server) to establish baseline or initial condition of the insured asset(s). The remote server may also analyze 1406 the 3D data to identify features of the insured assets. The method 1400 may include establishing or determining 1408, via the remote server, a replacement cost or value of the insured assets. The method 1400 may include generating 1410 an insurance quote for home, auto, personal articles, or other insurance covering the insured asset, and transmitting the insurance quote to the customer's mobile device for their review.

The method 1400 may include receiving 1412 post-insurance event 3D data of the insured asset(s). The insurance event may include events that cause water, fire, smoke, wind, or hail damage to a home, vehicle, personal article, or other insured asset. For instance, the post-insurance event 3D data may reveal an amount and depth of hail dents or hail damage to a vehicle, or to the siding or roofing of a home.

The post-insurance event 3D data may be compared 1414 with a baseline or initial condition 3D data of the insured asset(s). The method 1400 may further include determining 1416 an estimated repair or replacement cost for the insured asset(s). The method 1400 may also include preparing 1418 a proposed virtual insurance claim for the insured's review, and transmitting the proposed virtual insurance claim to their mobile device for display, and their review, modification, or approval. The method 1400 may include additional, less, or alternate actions, including those discussed elsewhere herein.

Figure 15:
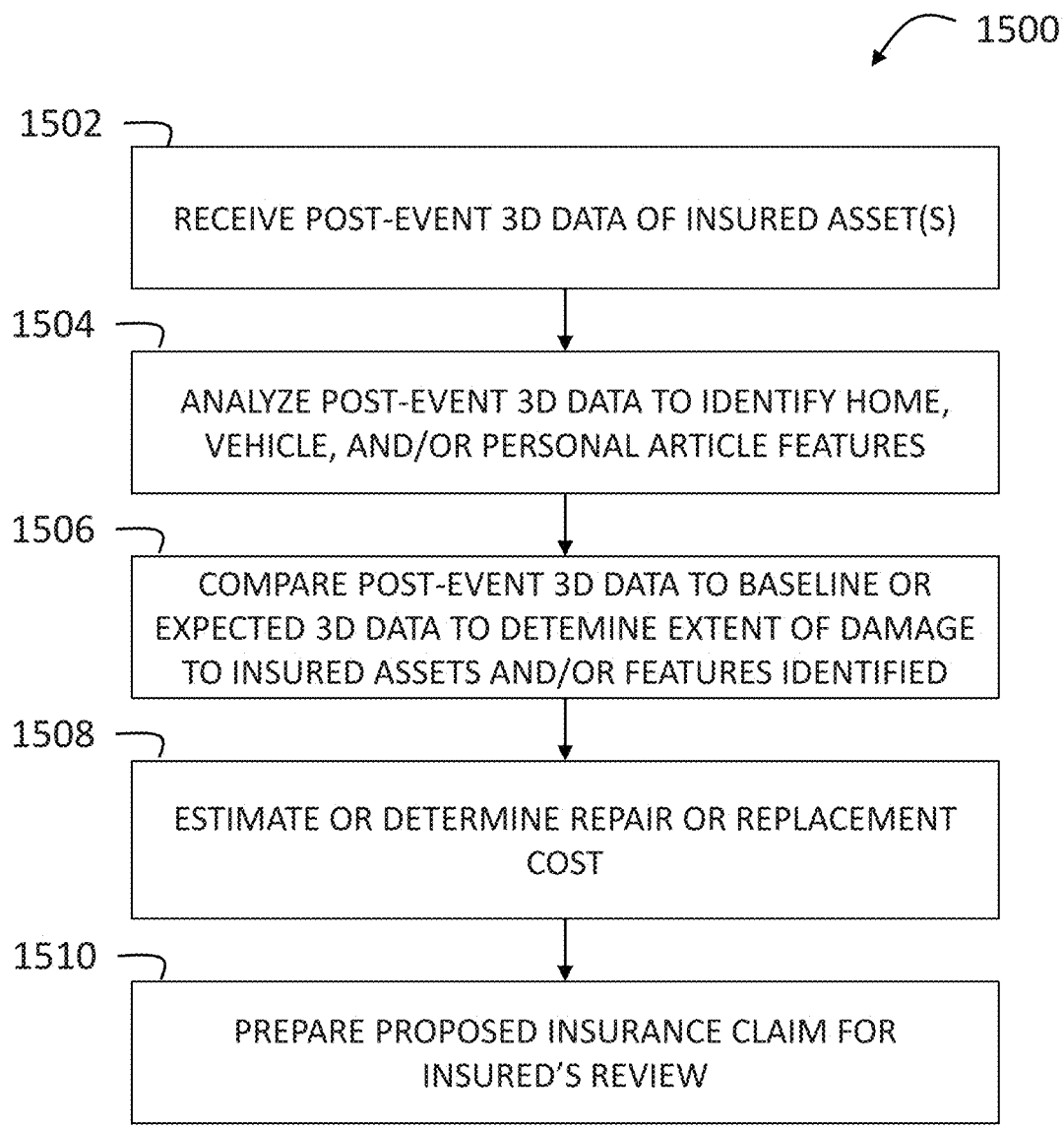
FIG. 15 depicts another exemplary computer-implemented method of estimating repair and/or replacement costs for insured assets using 3D data.

FIG. 15 depicts another exemplary computer-implemented method of estimating repair and/or replacement costs for insured assets using 3D data 1500. The method 1500 may include receiving post-insurance event 3D data of the insured asset(s) 1502. The insurance event may include events that cause water, fire, smoke, wind, or hail damage to a home, vehicle, personal article, or other insured asset. For instance, the post-insurance event 3D data may indicate an amount of smoke damage to a home, an amount of hail damage to a vehicle, or an amount of hail damage to the roof of a home.

The method may include analyzing 1504 the post-insurance event 3D data to identify insured asset features, and comparing 1506 the post-insurance event 3D data to a baseline or expected 3D data to determine 1508 an extent of damage to the insured asset(s) and/or feature(s) identified. For instance, the damage may be hail, wind, water, fire, or smoke damage to personal articles, vehicles, or homes.

The method 1500 may further include determining 1508 an estimated repair or replacement cost for the insured asset(s). The method 1500 may also include preparing 1510 a proposed virtual insurance claim for the insured's review, and transmitting the proposed virtual insurance claim to their mobile device for display, and their review, modification, or approval. The method 1500 may include additional, less, or alternate actions, including those discussed elsewhere herein, including that discussed with respect to FIG. 14.

Exemplary Home Feature Repair/Replacement Cost Methods

In one aspect, a computer-implemented method of estimating a repair or replacement cost for home features may be provided. The method may include (1) receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determining or identifying, via the one or more processors, room (or home) features based upon computer analysis (such as via object recognition and/or optical character recognition techniques) of the 3D data from the 3D scanner; (3) determining or estimating, via the one or more processors, the type, dimensions, and/or manufacturer of the room features based upon computer analysis (such as via object recognition and/or optical character recognition techniques) of the 3D data from the 3D scanner; (4) determining or estimating, via the one or more processors, an extent of damage to the room and/or room features caused by the insurance-related event based upon computer analysis (such as via object recognition and/or optical character recognition techniques) of the 3D data from the 3D scanner; (5) determining, via the one or more processors, an estimated repair or replacement cost of the room and/or the room features based upon (i) the type, dimensions, and/or manufacturer of the room features, and/or (ii) the extent of damage to the room and/or room features caused by the insurance-related event determined, at least in part, from computer analysis of the 3D data of the room; and/or (6) transmitting, via the one or more processors (and/or associated transceivers, such as via wireless communication or data transmission), the estimated repair or replacement cost of the room and/or room features to a mobile device of a customer for their review, modification, or approval.

The method may include preparing, via the one or more processors, a proposed insurance claim based upon the estimated repair or replacement cost of the room and/or room features; and/or transmitting, via the one or more processors (and/or transceivers), the proposed insurance claim to the mobile device of the customer for their review, modification, or approval.

The room feature and/or type of room feature may be one or more of: room type; ceiling type; window type; window subtype; door or doorway type or subtype; and/or staircase type. The room feature may be one of, or associated with, paneling, windows, ceilings, flooring, cabinetry, countertops, fireplaces, appliances (refrigerator, dish washer, oven, clothes washer or dryer, etc.), or lighting, and the type is one of, or associated with, paneling, windows, ceilings, flooring, cabinetry, countertops, fireplaces, appliances, or lighting type or kind, respectively. The manufacturer may be one of, or associated with, a paneling, windows, ceilings, flooring, cabinetry, countertops, fireplaces, appliances, or lighting manufacturer, respectively.

The dimensions of the room feature may include paneling, window, ceiling, flooring, cabinetry, countertop, fireplace, appliance, or lighting dimensions, respectively. The extent of damage estimated may include estimated dimensions of a damaged area within the room, or estimated dimensions of a damaged room feature (such as an area or size of paneling, windows, ceiling, flooring, cabinetry, countertops, or appliances that need to be replaced, for instance, due to smoke, fire, or water damage).

In another aspect, a computer-implemented method of estimating a repair or replacement cost for home features may be provided. The method may include (1) receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determining, via the one or more processors, room dimensions of the room based upon computer analysis of the 3D data; (3) generating, via the one or more processors, a virtual depiction of the room based upon the 3D data and/or room dimensions determined from the 3D data, the virtual depiction of the room including the room dimensions superimposed on the virtual depiction of the room; (4) determining or identifying, via the one or more processors, room (or home) features based upon computer analysis (such as via object recognition and/or optical character recognition techniques) of the 3D data from the 3D scanner; (5) determining or estimating, via the one or more processors, the type, dimensions, and/or manufacturer of the room features based upon computer analysis (such as via object recognition and/or optical character recognition techniques) of the 3D data from the 3D scanner; (6) determining or estimating, via the one or more processors, an extent of damage to the room and/or room features caused by the insurance-related event based upon computer analysis (such as via object recognition and/or optical character recognition techniques) of the 3D data from the 3D scanner; (7) determining, via the one or more processors, an estimated repair or replacement cost for the home, room, and/or room features based upon (i) the type, dimensions, and/or manufacturer of the room features, and/or (ii) the extent of damage caused by the insurance-related event determined, at least in part, from computer analysis of the 3D data of the room; and/or (8) transmitting, via the one or more processors (and/or associated transceivers, such as via wireless communication or data transmission), the estimated repair or replacement cost of the home, room, and/or room features to a mobile device of a customer for their review, modification, or approval. The method may include preparing, via the one or more processors, a proposed insurance claim based upon the estimated repair or replacement cost of the home, room, and/or room features; and/or transmitting, via the one or more processors (and/or transceivers), the proposed insurance claim to the mobile device of the customer for their review, modification, or approval.

In another aspect, a computer-implemented method of estimating a repair or replacement cost for home features may be provided. The method may include (1) receiving, via one or more processors (and/or associated transceivers, such as via wireless communication or data transmission), 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determining, via the one or more processors, room dimensions of the room based upon computer analysis of the 3D data; (3) determining or identifying, via the one or more processors, room (or home) features based upon computer analysis (such as object recognition and/or optical character recognition techniques) of the 3D data from the 3D scanner; (4) determining or estimating, via the one or more processors, the type, dimensions, and/or manufacturer of the room features based upon computer analysis (such as via object recognition and/or optical character recognition techniques) of the 3D data from the 3D scanner; (5) determining or estimating, via the one or more processors, an extent of damage to the home, room and/or room features caused by the insurance-related event based upon computer analysis (such as via object recognition and/or optical character recognition techniques) of the 3D data from the 3D scanner; (6) generating, via the one or more processors, a virtual depiction of the room based upon the 3D data and/or room dimensions determined from the 3D data, the virtual depiction of the room including (a) the room dimensions, and/or (b) type, dimensions, and/or manufacturer of the room features superimposed on the virtual depiction of the room, and (c) a graphical representative of the extent of damage to the home, room, and/or room features; (7) determining, via the one or more processors, an estimated repair or replacement cost for the home, room, or room features based upon (i) the type, dimensions, and/or manufacturer of the room features, and/or (ii) the extent of damage caused by the insurance-related event determined, at least in part, from computer analysis of the 3D data of the room; and/or (8) transmitting, via the one or more processors (and/or associated transceivers, such as via wireless communication or data transmission), the estimated repair or replacement cost of the home, room, and/or room features to a mobile device of a customer for their review, modification, or approval.

The method may include preparing, via the one or more processors, a proposed insurance claim based upon the estimated repair or replacement cost of the home, room, and/or room features; and/or transmitting, via the one or more processors (and/or transceivers), the proposed insurance claim to the mobile device of the customer for their review, modification, or approval.

In another aspect, a computer-implemented method of estimating a repair or replacement cost for home features may be provided. The method may include (1) receiving, via one or more processors (and/or transceivers, such as via wireless communication or data transmission), 3D data (or 3D image data) of a room of a structure acquired or generated by a 3D laser or light (or other) scanner (such as a 3D scanner associated with a mobile device (e.g., smart phone or tablet)); (2) determining, via the one or more processors, room dimensions of the room based upon computer analysis of the 3D data; (3) generating, via the one or more processors, a virtual depiction of the room based upon the 3D and/or room dimensions determined from the 3D data, the virtual depiction of the room including the room dimensions superimposed on the virtual depiction of the room; (4) determining or identifying, via the one or more processors, room (or home) features based upon computer analysis (such as via object recognition and/or optical character recognition techniques) of the 3D data from the 3D scanner; (5) determining or estimating, via the one or more processors, the type, dimensions, and/or manufacturer of the room features based upon computer analysis (such as via object recognition and/or optical character recognition techniques) of the 3D data from the 3D scanner; and/or (6) determining, via the one or more processors, an estimated repair or replacement cost of the home, room, and/or room features based upon the type, dimensions, and/or manufacturer determined, at least in part, from computer analysis of the 3D data of the room.

The method may include adding, via the one or more processors, the room to a virtual representation of the home associated with the user; and/or adding the repair or replacement cost for the room and/or room features to a total repair or replacement cost associated with all rooms within the home. The method may include generating, via the one or more processors, a quote for homeowners insurance based upon the total repair or replacement cost generating, and transmitting, via the one or more processors (and/or associated transceivers, such as via wireless communication or data transmission), the quote to the user's mobile device for display thereon and their review, modification, or approval to facilitate providing more accurate insurance pricing.

The method may include receiving, via the one or more processors (and/or associated transceivers), post-insurance event 3D data of the room generated by a 3D scanner from the user's mobile device; comparing, via the one or more processors, the 3D data with the post-insurance event 3D data post-insurance event 3D data to determine an amount of damage to the home, room, and/or room features; generating, via the one or more processors, an estimated repair or replacement cost for the home, room, and/or room features based upon the comparison; generating, via the one or more processors, a proposed insurance claim for an insured based upon the estimated repair or replacement cost; and/or transmitting, via the one or more processors (and/or associated transceivers), the proposed insurance claim to the insured's mobile device for their review, modification, or approval.

The method may include preparing, via the one or more processors, a proposed insurance claim based upon the estimated repair or replacement cost of the home, room, and/or room features; and transmitting, via the one or more processors (and/or transceivers), the proposed insurance claim to the mobile device of the customer for their review, modification, or approval. The extent of damaged estimated includes estimated dimensions of a damaged area within the room, or estimated dimensions of a damaged room feature (such as an area of paneling, ceiling, flooring, cabinetry, or countertops that need to be replaced, for instance, due to water, smoke, or fire damage).

The foregoing methods may include additional, less, or alternate actions, including those discussed elsewhere herein. Additionally or alternatively, the foregoing methods may be implemented via one or more local or remote processors and/or transceivers, and/or via computer-executable instructions stored on non-transitory computer-readable media or medium.

Exemplary Personal Articles Repair/Replacement Cost

In another aspect, a computer-implemented method of estimating a repair or replacement cost for one or more personal articles may be provided. The method may include (1) receiving, via one or more processors (and/or associated transceivers, such as via wireless communication or data transmission), 3D data (or 3D image data) of a personal article (or personal belonging) acquired via, or generated by, a 3D laser or light (or other) scanner (such as a 3D scanner associated with a mobile device (e.g., smart phone or tablet)); (2) determining or identifying, via the one or more processors, (i) the personal article, and/or (ii) features of the personal article based upon computer analysis (such as object recognition and/or optical character recognition techniques) of the 3D data from the 3D scanner (for instance by comparing the 3D data of the personal article with a virtual catalog known items); (3) determining or estimating, via the one or more processors, the type and/or manufacturer of the personal article based upon computer analysis (such as object recognition and/or optical character recognition techniques) of the 3D data from the 3D scanner; and/or (4) determining, via the one or more processors, an estimated repair or replacement cost for the personal article based upon (i) the personal article, (ii) features of the personal article, (iii) type of the personal article, and/or (iv) manufacturer of the personal article determined, at least in part, from computer analysis of the 3D data of the room.

The method may include adding, via the one or more processors, the personal article to an inventory list associated with the user; and/or adding, via the one or more processors, the repair or replacement cost for the personal article to a total repair or replacement cost associated with all personal articles including within the inventory list. The method may include adding, via the one or more processors, the personal article to a virtual inventory list associated with the user; adding, via the one or more processors, the repair or replacement cost for the personal article to a total repair or replacement cost associated with all personal articles including within the virtual inventory list; generating, via the one or more processors, a virtual quote for personal articles insurance based upon the total repair or replacement cost; and/or transmitting, via the one or more processors (and/or associated transceivers, such as via wireless communication or data transmission), the virtual quote for personal articles insurance to a mobile device of a user for their review, modification, or approval to facilitate providing a more accurate assessment of risk to personal belongings and providing more appropriate insurance coverage to customers.

The foregoing method may include additional, less, or alternate actions, including those discussed elsewhere herein. Additionally or alternatively, the foregoing method may be implemented via one or more local or remote processors and/or transceivers, and/or via computer-executable instructions stored on non-transitory computer-readable media or medium.

Exemplary Vehicle Repair/Replacement Cost Methods

In another aspect a computer-implemented method of estimating a repair or replacement cost for vehicle and/or vehicle features may be provided. The method may include (1) receiving, via one or more processors (and/or associated transceivers, such as via wireless communication or data transmission), 3D data (or 3D image data) of a vehicle after an insurance-related event has occurred (e.g., event that causes body, fire, smoke, water, hail, wind, or other damage to the vehicle) that is acquired or generated by a 3D laser or light (or other) scanner (such as a 3D scanner associated with a mobile device (e.g., smart phone or tablet)); (2) determining or identifying, via the one or more processors, a type of vehicle, vehicle manufacturer, vehicle age, and/or vehicle features based upon computer analysis (such as via object recognition and/or optical character recognition techniques) of the 3D data from the 3D scanner; (3) determining or estimating, via the one or more processors, an extent of damage to the vehicle or vehicle features caused by the insurance-related event based upon computer analysis (such as via object recognition and/or optical character recognition techniques) of the 3D data from the 3D scanner (such as determining dimensions of body damage, number of windows damaged, number of hail dents in the body, size of each hail dent in the body of the vehicle, etc.); (4) determining, via the one or more processors, an estimated repair or replacement cost of the vehicle and/or the vehicle features based upon (i) the type of vehicle, vehicle features, and vehicle manufacturer, and/or (ii) the extent of damage to the vehicle and/or vehicle features caused by the insurance-related event determined, at least in part, from computer analysis of the 3D data of the room; and/or (5) transmitting, via the one or more processors (and/or associated transceivers, such as via wireless communication or data transmission), the estimated repair or replacement cost of the vehicle and/or vehicle features to a mobile device of a customer for display and their review, modification, or approval.

The method may include preparing, via the one or more processors, a proposed insurance claim based upon the estimated repair or replacement cost of the vehicle and/or vehicle features; and/or transmitting, via the one or more processors (and/or transceivers), the proposed insurance claim to the mobile device of the customer for their review, modification, or approval. The method may include receiving, via one or more processors (and/or associated transceivers, such as via wireless communication or data transmission), 3D data (or 3D image data) of an injured passenger or driver after the insurance-related event has occurred (e.g., vehicle crash) that is acquired or generated by a 3D laser or light (or other) scanner (such as a 3D scanner associated with a mobile device (e.g., smart phone or tablet)); determining or estimating, via the one or more processors, an extent or severity of injuries to the injured person caused by the insurance-related event based upon computer analysis of the 3D data from the 3D scanner; and/or if the extent or severity of injuries requires medical attention, requesting, via the one or more processors (and/or transceivers), that medical personal or an ambulance travel to the scene of the vehicle crash and provide medical attention.

In another aspect, a computer-implemented method of estimating a repair or replacement cost for vehicle or vehicle feature may be provided. The method may include (1) receiving, via one or more processors (and/or associated transceivers, such as via wireless communication or data transmission), 3D data (or 3D image data) of a vehicle acquired via, or generated by, a 3D laser or light (or other) scanner (such as a 3D scanner associated with a mobile device (e.g., smart phone or tablet)); (2) determining or identifying, via the one or more processors, (i) the vehicle, and/or (ii) features of the vehicle based upon computer analysis (such as object recognition and/or optical character recognition techniques) of the 3D data from the 3D scanner (for instance by comparing the 3D data of the vehicle with a virtual catalog known vehicles); (3) determining or estimating, via the one or more processors, the type and/or manufacturer of the vehicle based upon computer analysis (such as object recognition and/or optical character recognition techniques) of the 3D data from the 3D scanner; and/or (4) determining, via the one or more processors, an estimated repair or replacement cost for the vehicle based upon (i) the vehicle, (ii) features of the vehicle, (iii) type of vehicle, and/or (iv) manufacturer of the vehicle determined, at least in part, from computer analysis of the 3D data of the room. The method may include generating, via the one or more processors, a virtual quote for auto insurance based upon the total repair or replacement cost; and/or transmitting, via the one or more processors (and/or associated transmitters), the virtual quote to a mobile device of a customer for their review, modification, or approval.

The foregoing methods may include additional, less, or alternate actions, including those discussed elsewhere herein. Additionally or alternatively, the foregoing methods may be implemented via one or more local or remote processors and/or transceivers, and/or via computer-executable instructions stored on non-transitory computer-readable media or medium.

Exemplary Computer Systems for Determining Repair or Replacement Cost for Home Features In one aspect, a computer system for estimating a repair or replacement cost for home features may be provided. The computer system may include one or more processors and/or transceivers configured to: (1) receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determine or identify room (or home) features based upon computer analysis (such as via object recognition and/or optical character recognition techniques) of the 3D data from the 3D scanner; (3) determine or estimate the type, dimensions, and/or manufacturer of the room features based upon computer analysis (such as via object recognition and/or optical character recognition techniques) of the 3D data from the 3D scanner; (4) determine or estimate an extent of damage to the room and/or room features caused by the insurance-related event based upon computer analysis (such as via object recognition and/or optical character recognition techniques) of the 3D data from the 3D scanner; (5) determine an estimated repair or replacement cost of the room and/or the room features based upon (i) the type, dimensions, and/or manufacturer of the room features, and/or (ii) the extent of damage to the room and/or room features caused by the insurance-related event determined, at least in part, from computer analysis of the 3D data of the room; and/or (6) transmit, via wireless communication or data transmission, the estimated repair or replacement cost of the room and/or room features to a mobile device of a customer for display and their review, modification, or approval.

The one or more processors and/or transceivers may be further configured to: prepare a proposed insurance claim based upon the estimated repair or replacement cost of the room and/or room features; and transmit the proposed insurance claim to the mobile device of the customer for display and their review, modification, or approval. The room feature may be one of, or associated with, paneling, windows, ceilings, flooring, cabinetry, countertops, fireplaces, appliances (refrigerator, dish washer, oven, clothes washer or dryer, etc.), or lighting. The type of home or room feature may be one of, or associated with, paneling, windows, ceilings, flooring, cabinetry, countertops, fireplaces, appliances, or lighting type or kind, respectively. The manufacturer may be one of, or associated with, a paneling, windows, ceilings, flooring, cabinetry, countertops, fireplaces, appliances, or lighting manufacturer, respectively.

The extent of damage estimated may include estimated dimensions of a damaged area within the room, or estimated dimensions of a damaged room feature (such as an area or size of paneling, windows, ceiling, flooring, cabinetry, countertops, or appliances that need to be replaced, for instance, due to smoke, fire, or water damage).

In another aspect, a computer system for estimating a repair or replacement cost for room or home features may be provided. The computer system may include one or more processors and/or transceivers configured to: (1) receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determine room dimensions of the room based upon computer analysis of the 3D data; (3) generate a virtual depiction of the room based upon the 3D data and/or room dimensions determined from the 3D data, the virtual depiction of the room including the room dimensions superimposed on the virtual depiction of the room; (4) determine or identify room (or home) features based upon computer analysis (such as via object recognition and/or optical character recognition techniques) of the 3D data from the 3D scanner; (5) determine or estimate the type, dimensions, and/or manufacturer of the room features based upon computer analysis (such as via object recognition and/or optical character recognition techniques) of the 3D data from the 3D scanner; (6) determine or estimate an extent of damage to the room and/or room features caused by the insurance-related event based upon computer analysis (such as via object recognition and/or optical character recognition techniques) of the 3D data from the 3D scanner; (7) determine an estimated repair or replacement cost for the home, room, and/or room features based upon (i) the type, dimensions, and/or manufacturer of the room features, and/or (ii) the extent of damage caused by the insurance-related event determined, at least in part, from computer analysis of the 3D data of the room; and/or (8) transmit, via wireless communication or data transmission, the estimated repair or replacement cost of the home, room, and/or room features to a mobile device of a customer for their review, modification, or approval. The one or more processors and/or transceivers may be further configured to: prepare a proposed insurance claim based upon the estimated repair or replacement cost of the home, room, and/or room features; and/or transmit the proposed insurance claim to the mobile device of the customer for their review, modification, or approval.

In another aspect, a computer system for estimating a repair or replacement cost for a home or room feature. The computer system may include one or more processors and/or transceivers configured to: (1) receive, via wireless communication or data transmission, 3D data (or 3D image data) of a room of a structure after an insurance-related event has occurred (e.g., event that causes fire, smoke, water, hail, wind, or other damage to the structure) that is acquired or generated by a 3D laser or light (or other) scanner (such as a 3D scanner associated with a mobile device (e.g., smart phone or tablet)); (2) determine room dimensions of the room based upon computer analysis of the 3D data; (3) determine or identify room (or home) features based upon computer analysis (such as object recognition and/or optical character recognition techniques) of the 3D data from the 3D scanner; (4) determine or estimate the type, dimensions, and/or manufacturer of the room features based upon computer analysis (such as via object recognition and/or optical character recognition techniques) of the 3D data from the 3D scanner; (5) determine or estimate an extent of damage to the home, room and/or room features caused by the insurance-related event based upon computer analysis (such as via object recognition and/or optical character recognition techniques) of the 3D data from the 3D scanner; (6) generate a virtual depiction of the room based upon the 3D data and/or room dimensions determined from the 3D data, the virtual depiction of the room including (a) the room dimensions, and/or (b) type, dimensions, and/or manufacturer of the room features superimposed on the virtual depiction of the room, and (c) a graphical representative of the extent of damage to the home, room, and/or room features; (7) determine an estimated repair or replacement cost for the home, room, or room features based upon (i) the type, dimensions, and/or manufacturer of the room features, and/or (ii) the extent of damage caused by the insurance-related event determined, at least in part, from computer analysis of the 3D data of the room; and/or (8) transmit, via wireless communication or data transmission, the estimated repair or replacement cost of the home, room, and/or room features to a mobile device of a customer for their review, modification, or approval. The one or more processors and/or transceivers may be further configured to: prepare a proposed insurance claim based upon the estimated repair or replacement cost of the home, room, and/or room features; and transmit the proposed insurance claim to the mobile device of the customer for display thereon and their review, modification, or approval.

In another aspect, a computer system for estimating a repair or replacement cost for a room or home feature may be provided. The computer system may include one or more processors and/or transceivers configured to: (1) receive, via wireless communication or data transmission, 3D data (or 3D image data) of a room of a structure acquired or generated by a 3D laser or light (or other) scanner (such as a 3D scanner associated with a mobile device (e.g., smart phone or tablet)); (2) determine room dimensions of the room based upon computer analysis of the 3D data; (3) generate a virtual depiction of the room based upon the 3D and/or room dimensions determined from the 3D data, the virtual depiction of the room including the room dimensions superimposed on the virtual depiction of the room; (4) determine or identify room (or home) features based upon computer analysis (such as via object recognition and/or optical character recognition techniques) of the 3D data from the 3D scanner; (5) determine or estimate the type, dimensions, and/or manufacturer of the room features based upon computer analysis (such as via object recognition and/or optical character recognition techniques) of the 3D data from the 3D scanner; and/or (6) determine an estimated repair or replacement cost of the home, room, and/or room features based upon the type, dimensions, and/or manufacturer determined, at least in part, from computer analysis of the 3D data of the room.

The one or more processors and/or transceivers may be further configured to: add the room to a virtual representation of the home associated with the user; and/or add the repair or replacement cost for the room and/or room features to a total repair or replacement cost associated with all rooms within the home. The one or more processors and/or transceivers may be further configured to: generate a quote for homeowners insurance based upon the total repair or replacement cost generating, and/or transmit, via wireless communication or data transmission, the quote to the user's mobile device for their review, modification, or approval to facilitate providing more accurate insurance pricing.

The one or more processors and/or transceivers may be further configured to: receive post-insurance event 3D data of the room generated by a 3D scanner from the user's mobile device; compare the 3D data with the post-insurance event 3D data post-insurance event 3D data to determine an amount of damage to the home, room, and/or room features; generate an estimated repair or replacement cost for the home, room, and/or room features based upon the comparison; generate a proposed insurance claim for an insured based upon the estimated repair or replacement cost; and/or transmit the proposed insurance claim to the insured's mobile device for display and their review, modification, or approval.

The one or more processors and/or transceivers may be further configured to: prepare a proposed insurance claim based upon the estimated repair or replacement cost of the home, room, and/or room features; and transmit the proposed insurance claim to the mobile device of the customer for display and their review, modification, or approval. The extent of damaged estimated may include estimated dimensions of a damaged area within the room, or estimated dimensions of a damaged room feature (such as an area of paneling, ceiling, flooring, cabinetry, or countertops that need to be replaced, for instance, due to water, smoke, or fire damage). The foregoing computer systems may include additional, less, or alternate functionality, including that discussed elsewhere herein.

Exemplary Personal Article Repair/Replacement Cost System

In one aspect, a computer system for estimating a repair or replacement cost for one or more personal articles may be provided. The computer system comprising one or more processors and/or transceivers configured to: (1) receive, via wireless communication or data transmission, 3D data (or 3D image data) of a personal article (or personal belonging) acquired via, or generated by, a 3D laser or light (or other) scanner (such as a 3D scanner associated with a mobile device (e.g., smart phone or tablet)); (2) determine or identify (i) the personal article, and/or (ii) features of the personal article based upon computer analysis (such as object recognition and/or optical character recognition techniques) of the 3D data from the 3D scanner (for instance by comparing the 3D data of the personal article with a virtual catalog known items); (3) determine or estimate the type and/or manufacturer of the personal article based upon computer analysis (such as object recognition and/or optical character recognition techniques) of the 3D data from the 3D scanner; and/or (4) determine an estimated repair or replacement cost for the personal article based upon (i) the personal article, (ii) features of the personal article, (iii) type of the personal article, and/or (iv) manufacturer of the personal article determined, at least in part, from computer analysis of the 3D data of the room.

The one or more processors and/or transceivers further configured to: add the personal article to a virtual inventory list associated with the user; add the repair or replacement cost for the personal article to a total repair or replacement cost associated with all personal articles including within the virtual inventory list; generate a virtual quote for personal articles insurance (or homeowners or renters insurance) based upon, at least in part, the total repair or replacement cost; and/or transmit, via wireless communication or data transmission, the virtual quote for personal articles (or homeowners or renters) insurance to a mobile device of a user for display and their review, modification, or approval to facilitate providing a more accurate assessment of risk to personal belongings and providing more appropriate insurance coverage to customers. The foregoing computer system may include additional, less, or alternate functionality, including that discussed elsewhere herein.

Exemplary Vehicle Repair/Replacement Cost Systems

In one aspect, a computer system for determining a repair and/or replacement cost of a vehicle or vehicle features may be provided. The computer system may include one or more processors and/or transceivers configured to: (1) receive, such as via wireless communication or data transmission, 3D data (or 3D image data) of a vehicle after an insurance-related event has occurred (e.g., event that causes body, fire, smoke, water, hail, wind, or other damage to the vehicle) that is acquired or generated by a 3D laser or light (or other) scanner (such as a 3D scanner associated with a mobile device (e.g., smart phone or tablet)); (2) determine or identify a type of vehicle, vehicle manufacturer, vehicle age, and/or vehicle features based upon computer analysis (such as via object recognition and/or optical character recognition techniques) of the 3D data from the 3D scanner; (3) determine or estimate an extent of damage to the vehicle or vehicle features caused by the insurance-related event based upon computer analysis (such as via object recognition and/or optical character recognition techniques) of the 3D data from the 3D scanner (such as determining dimensions of body damage, number of windows damaged, number of hail dents in the body, size of each hail dent in the body of the vehicle, etc.); (4) determine an estimated repair or replacement cost of the vehicle and/or the vehicle features based upon (i) the type of vehicle, vehicle features, and vehicle manufacturer, and/or (ii) the extent of damage to the vehicle and/or vehicle features caused by the insurance-related event determined, at least in part, from computer analysis of the 3D data of the room; and/or (5) transmit, such as via wireless communication or data transmission, the estimated repair or replacement cost of the vehicle and/or vehicle features to a mobile device of a customer for display and their review, modification, or approval.

The one or more processors and/or transceivers further configured to: prepare a proposed insurance claim based upon the estimated repair or replacement cost of the vehicle and/or vehicle features; and/or transmit the proposed insurance claim to the mobile device of the customer for their review, modification, or approval.

The one or more processors and/or transceivers may be further configured to: receive, such as via wireless communication or data transmission, 3D data (or 3D image data) of an injured passenger or driver after the insurance-related event has occurred (e.g., vehicle crash) that is acquired or generated by a 3D laser or light (or other) scanner (such as a 3D scanner associated with a mobile device (e.g., smart phone or tablet)); determine or estimate an extent or severity of injuries to the injured person caused by the insurance-related event based upon computer analysis of the 3D data from the 3D scanner; and/or if the extent or severity of injuries requires medical attention, requesting, via the one or more processors (and/or transceivers), that medical personal or an ambulance travel to the scene of the vehicle crash and provide medical attention.

In another aspect, a computer system for estimating a repair or replacement cost for a vehicle or vehicle feature may be provided. The computer system may include one or more processors and/or transceivers configured to: (1) receive, such as via wireless communication or data transmission, 3D data (or 3D image data) of a vehicle acquired via, or generated by, a 3D laser or light (or other) scanner (such as a 3D scanner associated with a mobile device (e.g., smart phone or tablet)); (2) determine or identify (i) the vehicle, and/or (ii) features of the vehicle based upon computer analysis (such as object recognition and/or optical character recognition techniques) of the 3D data from the 3D scanner (for instance by comparing the 3D data of the vehicle with a virtual catalog known vehicles); (3) determine or estimate the type and/or manufacturer of the vehicle based upon computer analysis (such as object recognition and/or optical character recognition techniques) of the 3D data from the 3D scanner; and/or (4) determine an estimated repair or replacement cost for the vehicle based upon (i) the vehicle, (ii) features of the vehicle, (iii) type of vehicle, and/or (iv) manufacturer of the vehicle determined, at least in part, from computer analysis of the 3D data of the room.

The one or more processors and/or transceivers may be configured to: generate a virtual quote for auto insurance based upon the total repair or replacement cost; and/or transmit the virtual quote to a mobile device of a customer for their review, modification, or approval. The foregoing computer systems may include additional, less, or alternate functionality, including that discussed elsewhere herein.

ADDITIONAL CONSIDERATIONS

With the foregoing, an insurance customer may opt-in to a rewards, insurance discount, or other type of program. After the insurance customer provides their affirmative consent, an insurance provide 3D scanner application and/or remote server may collect 3D data taken by the insured using a 3D scanner. The 3D data may be associated with insured assets, including before, during, and/or after an insurance-related event, such as a home fire or vehicle collision. In return, risk-averse drivers, and/or vehicle owners may receive discounts or insurance cost savings related to auto, home, life, personal articles and other types of insurance from the insurance provider.

In one aspect, the 3D data may be collected or received by an insured's mobile device or a dedicated 3D scanner, and/or an insurance provider remote server, such as via direct or indirect wireless communication or data transmission from an application running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk and/or technology that mitigates or prevents risk to insured assets, such as homes, personal belongings, or vehicles.

Although not preferred, in addition to 3D scanning, some embodiments may utilize 2D scanning or determining dimensions from 2D digital or other images. For instance, room dimensions may be determined from 2D images.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A structural analysis computing device for determining structural characteristics of an object pictured in a three-dimensional (3D) image, the structural analysis computing device comprising:
 a memory;
 a user interface;
 an object sensor configured to scan an interior structure of a room to capture the 3D image of the room, wherein the room includes a plurality of objects; and
 at least one processor in communication with the memory and the object sensor, wherein the at least one processor is programmed to:
  access the 3D image including an object of the plurality of objects;
  automatically determine a first plurality of measurements associated with the object from the 3D image using image analysis trained using one or more machine learning algorithms;
  receive a project identifier associated with the object; and
  append the project identifier to a data file that includes the 3D image and that is stored in the memory.

2. The structural analysis computing device of claim 1, further comprising an input device configured to receive input from a user of the structural analysis computing device, wherein the at least one processor is further programmed to:
 receive a first user input at a first input location on the input device, the first input location corresponding to a first physical location associated with the object pictured in the 3D image;
 receive a second user input at a second input location on the input device, the second input location corresponding to a second physical location associated with the object pictured in the 3D image, the second input location spaced apart from the first input location on the input device by a first distance;
 calculate a second distance between the first physical location and the second physical location using the first distance and the first plurality of extracted measurements; and
 append the calculated second distance to the data file stored within the memory.

3. The structural analysis computing device of claim 2, wherein the calculated second distance includes at least one of a cabinetry length, a cabinetry height, a countertop dimension, a door opening dimension, a window opening dimension, and an appliance dimension.

4. The structural analysis computing device of claim 1, wherein the at least one processor is further programmed to:
 extract at least one building material associated with the object from the 3D image; and
 append the at least one building material to the data file stored in the memory.

5. The structural analysis computing device of claim 1, wherein the data file comprises an XML file.

6. The structural analysis computing device of claim 1, wherein the room is associated with a structure and the project identifier includes a structure identifier, and wherein the at least one processor is further programmed to:
 receive room data associated with the room of the structure; and
 append the room data to the data file stored in the memory.

7. The structural analysis computing device of claim 6, wherein room data includes at least one of room name, room type, ceiling type, window type, window subtype, doorway type, doorway subtype, and staircase information.

8. The structural analysis computing device of claim 1, wherein the project identifier includes claim identification information associated with an insurance claim, wherein the insurance claim is associated with damage to the object.

9. The structural analysis computing device of claim 8, wherein the at least one processor is further programmed to:
 retrieve the data file from the memory;
 determine whether the project identifier is associated with an existing project;
 if the project identifier is not associated with an existing project, generate a first project associated with the project identifier;
 determine a location and an extent of the damage to the object using at least the first plurality of measurements;
 generate a claim evaluation including a proposed claim disbursement amount using the location and the extent of the damage to the object; and
 transmit the claim evaluation to an insurance server associated with an insurance provider, the claim evaluation including instructions for the insurance server to generate a pre-populated claim form.

10. The structural analysis computing device of claim 1, wherein the object sensor comprises at least one infrared light source, at least one structured light projector, and at least one infrared camera.

11. The structural analysis computing device of claim 1, wherein the object sensor is integral to the structural analysis computing device.

12. The structural analysis computing device of claim 1, wherein the first plurality of extracted measurements includes at least one of wall lengths, wall heights, missing wall lengths, and missing wall heights.

13. The structural analysis computing device of claim 1, wherein the memory includes a cloud storage device.

14. A computer-based method for extracting structural characteristics of an object pictured in a three-dimensional (3D) image, implemented using a structural analysis computing device including a memory, a user interface, an object sensor configured to scan an interior structure of a room to capture the 3D image of the object, and at least one processor in communication with the memory and the object sensor, said method comprising:

scanning an interior structure of the room to capture the 3D image of the room;

accessing the 3D image including the object;

automatically extracting a first plurality of measurements associated with the object from the 3D image using image analysis trained using one or more machine learning algorithms;

receiving a project identifier associated with the object; and appending the project identifier to a data file that includes the 3D image and that is stored in the memory.

15. The computer-based method of claim 14, wherein the structural analysis computing device further includes an input device configured to receive input from a user of the structural analysis computing device, said method further comprising:

receiving a first user input at a first input location on the input device, the first input location corresponding to a first physical location associated with the object pictured in the 3D image;

receiving a second user input at a second input location on the input device, the second input location corresponding to a second physical location associated with the object pictured in the 3D image, the second input location spaced apart from the first input location on the input device by a first distance;

calculating a second distance between the first physical location and the second physical location using the first distance and the first plurality of extracted measurements; and appending the calculated second distance to the stored data file.

16. The computer-based method of claim 15, wherein calculating the second distance comprises calculating at least one of a cabinetry length, a cabinetry height, a countertop dimension, a door opening dimension, a window opening dimension, and an appliance dimension.

17. The computer-based method of claim 14 further comprising:

receiving a project identifier associated with the object; and appending the project identifier to the data file stored in the memory.

18. The computer-based method of claim 17, wherein the object includes a structure and the project identifier includes a structure identifier, said method further comprising:

receiving room data associated with a room of the structure; and appending the room data to the stored data file.

19. The computer-based method of claim 18, wherein receiving room data comprises receiving at least one of room name, room type, ceiling type, window type, window subtype, doorway type, doorway subtype, and staircase information.

20. The computer-based method of claim 14, further comprising:

retrieving the data file from the memory;

determining whether the project identifier is associated with an existing project;

if the project identifier is not associated with an existing project, generating a first project associated with the project identifier;

determining a location and an extent of the damage to the object using at least the first plurality of measurements;

generating a claim evaluation including a proposed claim disbursement amount using the location and the extent of the damage to the object; and transmitting the claim evaluation to an insurance server associated with an insurance provider, the claim evaluation including instructions for the insurance server to generate a pre-populated claim form.

\* \* \* \* \*